(12) United States Patent
Hart et al.

(10) Patent No.: US 7,480,234 B1
(45) Date of Patent: Jan. 20, 2009

(54) INITIAL TIMING ESTIMATION IN A WIRELESS NETWORK RECEIVER

(75) Inventors: Brian Hart, Wollstonecraft (AU); Milind D. Paranjpe, Mountain View, CA (US); John D. O'Sullivan, Hunters Hill (AU)

(73) Assignee: Cisco Technology, Inc., San Jose, CA (US)

( * ) Notice: Subject to any disclaimer, the term of this patent is extended or adjusted under 35 U.S.C. 154(b) by 1098 days.

(21) Appl. No.: 10/698,703

(22) Filed: Oct. 31, 2003

(51) Int. Cl.
*H04J 11/00* (2006.01)
(52) U.S. Cl. ..................... 370/208; 375/355
(58) Field of Classification Search ................. 370/503, 370/430, 208, 203, 319; 375/354, 316
See application file for complete search history.

(56) References Cited

U.S. PATENT DOCUMENTS

| | | | | |
|---|---|---|---|---|
| 5,732,113 | A * | 3/1998 | Schmidl et al. | ............. 375/355 |
| 6,498,822 | B1 * | 12/2002 | Tanaka | ........................ 375/354 |
| 6,646,980 | B1 * | 11/2003 | Yamamoto et al. | .......... 370/208 |
| 6,704,374 | B1 * | 3/2004 | Belotserkovsky et al. | ... 375/326 |
| 6,751,261 | B1 * | 6/2004 | Olsson et al. | ................ 375/260 |
| 6,754,170 | B1 * | 6/2004 | Ward | ........................... 370/208 |
| 6,785,350 | B1 * | 8/2004 | Poulbere et al. | ............. 375/343 |
| 7,009,931 | B2 * | 3/2006 | Ma et al. | ..................... 370/208 |

(Continued)

FOREIGN PATENT DOCUMENTS

EP     1229683 A2 *  8/2002

| | | | |
|---|---|---|---|
| EP | 1249980 A2 | * | 10/2002 |
| EP | 1276251 | * | 1/2003 |
| WO | WO9965180 | * | 12/1999 |

OTHER PUBLICATIONS

A. Fort, J. Weijers, V. Derudder, W. Eberle, A. Bourdoux. "A Performance and Complexity Comparison of Auto-Correlation and Cross-Correlation for OFDM Burst Synchronization." Proceeding of ICASSP, Apr. 2003, Hong Kong.

(Continued)

*Primary Examiner*—Edan Orgad
*Assistant Examiner*—Salman Ahmed
(74) *Attorney, Agent, or Firm*—Dov Rosenfeld; INVENTEK

(57) ABSTRACT

A method that includes wirelessly receiving a signal, and detecting a start of packet (SOP) for a packet that conforms to a wireless networking standard. The detecting from the received signal uses at least one SOP detection criterion. In the case an SOP is detected, the method further includes determining a plurality of metrics from the received signal, and using at least two of the plurality of metrics to determine an initial timing for a received packet. Different versions combine the metrics in different ways to determine the initial timing. Also an apparatus that includes a radio receiver to receive a signal and output a received signal, and an SOP detector coupled to the radio receiver to detect a start of packet (SOP) from a received signal using at least one SOP detection criterion for a packet that conforms to a wireless networking standard. The apparatus further includes a processing circuit coupled to the radio receiver to determine a plurality of metrics from the received signal, and a initial time determining circuit coupled to the SOP detector and the processing circuit. In the case an SOP is detected, the initial time determining circuit uses at least two of the plurality of metrics to determine an initial timing for a received packet.

38 Claims, 11 Drawing Sheets

U.S. PATENT DOCUMENTS

| | | | |
|---|---|---|---|
| 7,039,000 B2* | 5/2006 | You et al. | 370/203 |
| 7,251,282 B2* | 7/2007 | Maltsev et al. | 375/260 |
| 7,313,085 B2* | 12/2007 | Kim | 370/208 |
| 2003/0012297 A1* | 1/2003 | Imamura | 375/295 |
| 2003/0072256 A1* | 4/2003 | Kim | 370/208 |
| 2003/0112743 A1* | 6/2003 | You et al. | 370/203 |
| 2004/0090977 A1* | 5/2004 | Ha et al. | 370/430 |
| 2004/0170237 A1* | 9/2004 | Chadha et al. | 375/343 |
| 2004/0190560 A1* | 9/2004 | Maltsev et al. | 370/503 |
| 2004/0196923 A1* | 10/2004 | Feher | 375/299 |
| 2004/0264561 A1* | 12/2004 | Alexander et al. | 375/232 |
| 2005/0220212 A1* | 10/2005 | Marsili | 375/275 |
| 2006/0146962 A1* | 7/2006 | Troya et al. | 375/340 |

OTHER PUBLICATIONS

M. Gertou, G. Karachalios, D. Triantis, K. Papantoni, P. Dallas. "Synchronization Approach for OFDM Based Fixed Broadband Wireless Access Systems." IST Communications Mobile Summit 2001, Sep. 9-12, 2001. Barcelona, Spain. URL: http://easy.intranet.gr/paper_23.pdf.

M. Lasanen, J. Rautio, M. Nissil. "Timing Synchronization of the Wind-Flex OFDM Prototype." IST Mobile & Wireless Telecommunications Summit 2002, Jun. 16-19, 2002. Thessaloniki, Greece. URL: http://www.vtt.fi/ele/research/els/projects/windflexdocs/ist2002_synch_mpl.pdf.

R. Dönmez . "Synchronization Problem in OFDM and Digital Design of ETSI OFDM STS Symbol Synchronizer IP." Masters of Science Thesis, May 2003 . Sabancý University, Turkey. URL: http://people.sabanciuniv.edu/~yasar/thesis/riza_thesis_short.pdf.

F. Tufvesson, O. Edfors. "Preamble-based Time and Frequency Synchronization for OFDM systems." Submitted to IEEE Journal on Selected Areas in Communications, Jan. 2000. Also published in Fredrik Tufvesson, "Design of Wireless Communication Systems—Issues on Synchronization, Channel Estimation and Multi-Carrier Systems", Series of Licentiate and Doctoral Thesis, No. 19, ISSN 1402-8662, ISBN 91-7874-059-2, Department of Applied Electronics, Lund Univerisity, Lund, Sweden, Aug. 2000.

J. Van de Beek, M. Sandell, P.O. Börjesson. "ML Estimation of Time and Frequency Offset in OFDM Systems." IEEE Transactions on Signal Processing, vol. 45, No. 7, pp. 1800-1805, Jul. 1997. URL: http://www.sm.luth.se/csee/sp/research/article/ML_Est_Time_&_Frequency.pdf.

K. Nikitopoulos and A. Polydoros, "Post-FFT Fine Frame Synchronization For OFDM Systems," Proceedings of the IST Mobile Summit 2002, Thessaloniki, Greece, Jun. 2002.

T. Keller, L. Piazzo, P. Mandarini and L. Hanzo, "Orthogonal Frequency Division Multiplex Synchronization Techniques For Frequency-Selective Fading Channels," IEEE Journal on Selected Areas in Communications, vol. 19, No. 6, Jun. 2001, pp. 999-1008.

S.H. Ha, I. Hwang and H.S. Lee, "A Decision-Directed Frame Synchronization Algorithm For OFDM Systems," IEICE Transactions on Communication, vol. E83-B, No. 7, Jul. 2000, pp. 1563-1566.

Wai Yuen Lau, "Measurement Challenges For On-Wafer RF-SOC Test," SEMI Technology Symposium: International Electronics Manufacturing Technololgy (IEMT) Symposium, 2002, pp. 353-359.

* cited by examiner

INITIAL TIMING ESTIMATION IN A WIRELESS NETWORK RECEIVER

BACKGROUND

This invention is related to wireless data network receivers, and in particular to a method and apparatus for determining the initial time reference when receiving a packet in a packet based wireless network such as a wireless local area network (WLAN).

It is particularly applicable to a receiver that conforms to any of the OFDM variants of the IEEE802.11 standard such as IEEE 802.11a and 802.11g.

A station of a wireless network includes a physical layer processor (PHY) that includes radio receiver and radio transmitter, i.e., a radio transceiver, and a MAC processor. The receiver of the PHY needs to accurately detect the start of packet (SOP), and once the SOP is detected, to accurately determine a time reference for the received signals. In an OFDM receiver wherein received data is subject to a discrete Fourier Transform (DFT), usually as an FFT, the time reference is used to determine when to start the first DFT.

It in known to use the received signal strength indicator (RSSI) for so detecting the SOP. The resulting determined SOP time is in general not sufficiently accurate to provide initial timing estimate. For example, for the IEEE 802.11b standard, the time for the packet energy to rise from 10-to-90% may be as wide as 2 μs. We have found that this is too wide for accurate initial timing determination. Furthermore, by carrying our experiments, we found that there is more than one transient present, and that there is a very limited window to accurately determine when the RSSI jumped most quickly.

Packets for communication in a wireless network typically include a preamble and a modulated data part. The preamble provides for start of packet detection, automatic gain calculation, synchronization, and so forth, and have known parts. Correlation based methods also are known that detect known parts of the preamble in each packet. An IEEE 802.11a preamble, for example, includes ten known short symbols and two known long symbols with guard intervals. We have used such correlation-based techniques in an IEEE 802.11a radio chip and found that there were still missed packets. For example, one method we have tried used correlating the preamble with the known guard interval for the long symbol that occurs after the ten short symbols. A correlation threshold was set to determine the time. If we set the correlation threshold to be sufficiently high to avoid false triggers off the short symbols, and there was significant multipath, we found that such a method sometimes produce false negatives (missed packets). We believe this is because the multipath may reduce the size of correlation peak for the correlation with guard interval.

Thus there is a need in the art for an accurate initial timing estimation.

SUMMARY

While methods that each use one or another different metric or indicator for determining the initial timing may be known, the inventors have found that using any one metric does not work in all situations or even enough situations. We have invented a hybrid method that combines multiple metrics or indicators. In particular, we have a method for detecting the SOP, including using at least one SOP detecting criterion, and is used in combination with a method we have invented for determining the initial timing, including forming and using a plurality of metrics.

Described herein is a method that includes wirelessly receiving a signal and detecting a start of packet (SOP) for a packet that conforms to a wireless networking standard, the detecting from the received signal using at least one SOP detection criterion. In the case an SOP is detected, the method further includes determining a plurality of metrics from the received signal, and using at least two of the plurality of metrics to determine an initial timing for a received packet.

In one embodiment, a packet according conforming to the wireless networking standard includes a preamble and the detecting of the SOP includes using at least one of: detecting that a threshold is exceeded by the average received signal power, detecting that a threshold is exceeded by the average power rise of the received signal, detecting that a threshold is exceeded by a measure of the quality of the correlation of the input signal with a known part of the preamble. In another version, another possible criterion is detecting that a threshold is exceeded by the weighted sum of a measure of the rise in average received signal power and the measure of the correlation of the input signal with the known part of the preamble.

In another embodiment wherein the packet according to the standard includes the preamble, detecting the SOP includes determining an arbitrary defined logical function of a set of logical indicators including: that a significant average received signal power was detected, e.g., by detecting that a threshold was exceeded by the average received signal power, that a significant average power rise of the received signal was detected, e.g., by detecting that a threshold was exceeded by the significant average power rise of the received signal, and that a significant measure of the quality of the correlation of the input signal with a known part of the preamble was detected, e.g., by detecting that a threshold was exceeded by the correlation. In one version, the set of logical indicators further includes that a significant range of values is detected in the weighted sum of the measure of the rise in average received signal power and the measure of the correlation of the input signal with the known part of the preamble. Such detection, e.g., is by detecting that the weighted sum exceeds a threshold. A special case of this arbitrary logical function is that the SOP may be simply detected from a rise in the received signal power only.

In one version applicable to detecting the SOP for a packet that conforms to one of a plurality of wireless network standards, a separate logical function is formed for detecting a packet that conforms to each of the standards so that the SOP for a packet that conforms to any of the standards is detected.

In one version, the measure of the correlation quality is a comparison measure of the instantaneous correlation power with the average correlation power in the recent past. In another version, the measure of the correlation quality is a measure of the correlation power normalized by the power of the received signal.

According to embodiments described herein, the preamble of the packet according to the standard has a first part that includes a series of periodic symbols and a second part. Determining the plurality of metrics includes determining at least two of:

a measure of the carrier to noise ratio (CNR),
a measure of the received signal power,
a measure of the autocorrelation of the input signal at the period of the symbols,
a measure of the correlation of the input signal with at least one of the short symbols, and
a measure of the correlation of the input signal with the start of the second part of the preamble.

For the case of a wireless standard that uses OFDM, the at least two metrics may further include:
a measure of the short-term power spectral density of the received signal, and
a measure of interference between OFDM symbols.

Determining the initial timing uses at least two indicators of the set of indicators that includes:
whether or not a measure of the carrier to noise ratio (CNR) is within a CNR range,
that a signal power change threshold was exceeded by a measure of the rise of received signal power,
that a change was detected in a measure of the autocorrelation of the input signal at the period of the symbols, e.g., by a range being reached by the measure of the autocorrelation,
that a threshold was exceeded by a measure of the correlation of the input signal with at least one of the short symbols, and
that a change was detected in a measure of the correlation of the input signal with the start of the first part of the preamble, and
that a threshold was exceeded by a measure of the correlation of the input signal with the start of the second part of the preamble.

For the case of a wireless standard that uses OFDM, the set of indicators further includes:
that a threshold was exceeded by a measure of the short-term power spectral density of the received signal, and
that a range was reached by a measure of interference between OFDM symbols.

Determining the initial timing determines the timing from at least one of:
the time the rate of change of a measure of the received signal power is maximum,
the time a measure of the autocorrelation of the input signal at the period of the symbols changes to indicate the time of the end of the series of periodic symbols,
the time a measure of the correlation of the input signal with at least one of the short symbols peaks to indicate an SOP time, and
the time a measure of the correlation of the input signal with the start of the second part of the preamble peaks to indicate the time of the start of the second part.

In the OFDM case, the possible source(s) for determining the initial timing further include(s):
the time the a change occurs in a measure of the short-term power spectral density of the received signal, and
the time when a measure of the interference between OFDM symbols is lowest.

In an alternate embodiment, the set of possible metrics of which at least two metrics are determined includes a measure of the delay spread, and the set of possible indicators of which at least two indicators are used in the determining of the initial timing includes whether or not a measure of the delay spread is within a delay spread range.

The indicators used in the determining of the initial timing are determined either by a priori simulation, by a priori experimentation, or both by simulation and experimentation under a set of different CNR and delay spread conditions.

Determining the measure of the CNR includes computing the ratio of the received power during the presence of a packet and the received signal power a relatively small time before the packet arrived. In one version, each of the received powers before and after the packet is computed on a logarithmic scale, such that computing the ratio includes subtracting the received power during the presence of a packet and the received signal power the relatively small time before the packet arrived.

In an embodiment applicable to wireless standards according to which the symbols have substantially constant envelope, determining a measure of the autocorrelation, and in particular the departure of the autocorrelation from a purely positive real signal includes: determining an approximation to the phase of the autocorrelation, such as by phase shift key (PSK) detecting the input signal, and determining a monotonic function of the difference of the PSK detected signal and a delayed version of the PSK detected signal. One version further includes filtering the determined monotonic function of the difference.

In one embodiment, the input signal is provided as a set of received signal samples in rectangular coordinates. Determining the measure of the correlation of the input signal with the start of the second part of the preamble includes: filtering the received signal samples using a finite impulse response (FIR) filter whose coefficients are time-reversed, complex conjugated samples of start of the second part, quantized to rectangular coordinates of ±1 and 0, in particular to (±1,0)+j(±1,0).

In one embodiment, determining the measure of the correlation of the input signal with the start of the second part of the preamble includes calculating the amplitude of the correlation, and comparing the amplitude of the correlation with an average of recent samples of the correlation amplitude.

In one embodiment, determining of the initial timing includes detecting whether or not a measure of the CNR is in a CNR range wherein a first metric of the set of metrics is, expected to be effective, and using the first metric for the initial timing determining only if it is detected that the measure of the CNR is in the CNR range. For OFDM variants of the IEEE 802.11 standard, the first metric is the measure of autocorrelation, and determining the initial timing uses that a change was detected in the autocorrelation, e.g., by detecting that a range being reached by the autocorrelation measure only if it is detected that the measure of the CNR is in the CNR range.

In one embodiment, the determining the initial timing uses the time of the peak of the measure of the correlation of the input signal with the start of the second part of the preamble.

Also described herein is an apparatus that includes a radio receiver to receive a signal and output a received signal, and an SOP detector coupled to the radio receiver to detect a start of packet (SOP) from a received signal using at least one SOP detection criterion for a packet that conforms to a wireless networking standard. The apparatus further includes a processing circuit coupled to the radio receiver to determine a plurality of metrics from the received signal, and a initial time determining circuit coupled to the SOP detector and the processing circuit. In the case an SOP is detected, the initial time determining circuit uses at least two of the plurality of metrics to determine an initial timing for a received packet.

Different embodiments of the apparatus operate to implement the method embodiments described above. Different versions use the metrics combined in different ways to obtain the initial timing.

Other features and aspects will be apparent from the detailed description provided herein.

DETAILED DESCRIPTION

Described herein is a method and apparatus for determining the initial time reference ("initial timing") when receiving a packet in a packet based wireless network such as a wireless local area network (WLAN).

The invention will be described herein in terms of a WLAN station that operated according to OFDM variants of the IEEE 802.11 standard and proposed amendments. One receiver embodiment supports the IEEE 802:11g and 11a variants operating in the 2.4 GHz and 5 GHz frequency ranges, respectively. The invention is also applicable to a radio that operates under other wireless standard for which accurate timing determination is important, including other variants of the IEEE 802.11 standard.

A Receiver Architecture

Figure 1:
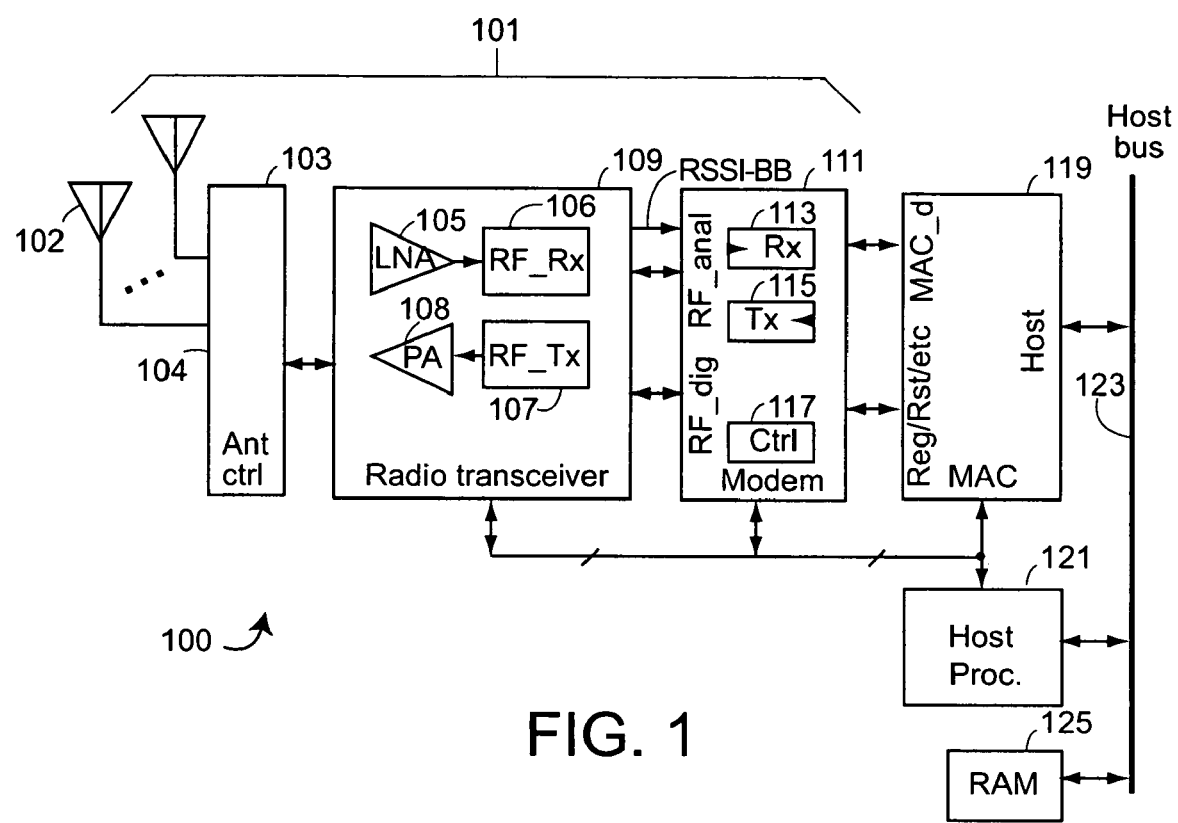
FIG. 1 shows a simplified block diagram of a wireless node that includes an apparatus embodying aspects of the invention.

FIG. 1 is a functional block diagram of a wireless network node 100 that includes an embodiment of present invention. Such an embodiment 100 includes a radio receiver to receive a signal and output a receive signal. The node 100 might be, for example, implemented on a PCMCIA wireless LAN card, and includes a physical layer interface (PHY processor) 101 that includes an antenna subsystem 102 with at least one antenna for the frequency or frequencies of service (approx. 2.4 GHz and/or approx. 5 GHz), and an antenna subsystem 103 that for the case half-duplex operation includes a transmit/receive (T/R) switch, and for the case of diversity, includes a diversity switch to select an antenna. The antenna subsystem is coupled to a radio receiver and a radio transmitter (together a transceiver 109) that in one embodiment is implemented as a single chip. The radio receiver of the transceiver includes a low-noise amplifier (LNA) 105 and receive radio frequency (RF) electronics 106. The radio transmitter part of the transceiver 109 includes transmit RF electronics 107 and a power amplifier (PA) 108. The transceiver provides an analog received signal to and accepts an analog signal for transmission from a modem 111 that includes a receiver part 113, a transmitter part 115, and a control part 117. The receiver part 113 includes start of packet (SOP) detection, automatic gain control, and aspects of the invention, including timing estimation. The receiver part 113 further includes the receive processing of the received data once SOP is detected, gains adjusted, and initial timing determined. The modem is coupled to the radio transceiver via an RF analog interface for the received signal and signal for transmission, and via an RF digital interface for such control signals as gain control and status.

One embodiment of the radio receiver uses a superheterodyne architecture with an intermediate frequency (IF) stage that includes an IF filter. The radio receiver provides a pair of received signal strength indication (RSSI) signals. One RSSI signal is the common RSSI signal post IF filter, e.g., at the end of the analog receiver, called RSSI-BB herein, and the other is pre-IF filtering, called RSSI-IF herein. These are used for automatic gain control (AGC). The RSSI-BB signal's exceeding a threshold is further used as one of the SOP detection criteria.

The system 100 further includes a medium access controller (MAC) processor 119 for layer-2 processing. The MAC processor accepts payload data from the modem, and provides payload data to the modem 111 via a data interface. The MAC processor further is connected to the modem 111 via a digital interface that provides access to the MAC processor of various status and data registers in the modem 111.

In one embodiment, the MAC processor is coupled to a host processor 121 via a host bus subsystem 123. While FIG. 1 shows a separate host processor, the host processor function may in other embodiments be incorporated with the MAC processor 119. In one embodiment, a memory, e.g., a random access memory element (RAM) 125 is included for program storage. The memory 125 may be directly coupled to the host or to the MAC processor or to both. There may also be additional memory, e.g., for buffering, and for simplicity, such additional memory will be assumed to be included in memory 125. One or more interfaces may be included, e.g., one or more interfaces that conform to well-known industry standards PCMCIA, PCI, USB, and so forth.

Some embodiments may use antenna diversity, e.g., two or more transmit antennas or two or more receive antennas or multiple antennas for both receiving and transmitting. The diversity may be provided by spatial diversity, or by having different polarizations at the antennas, and so forth. The antennas may be switched or combined. Such processing is known to improve performance in environments that include fading, and may even be used to provide spatial division multiple access (SDMA).

One embodiment of system 100 is compatible with one or more variants of the IEEE 802.11 standards for wireless local area network (LAN) applications. The RF transceiver 109 and modem 111 constitute a complete wireless engine for OSI Layer-1 physical layer (PHY) functionality for one or more of the IEEE 802.11 PHY variants, and the (MAC) 119 is substantially IEEE 802.11 compatible.

The Packet Structure

In one embodiment, a packet according the wireless networking standard includes a preamble and a modulated part. The preamble has a first part that includes a series of periodic symbols and a second part.

Figure 2:
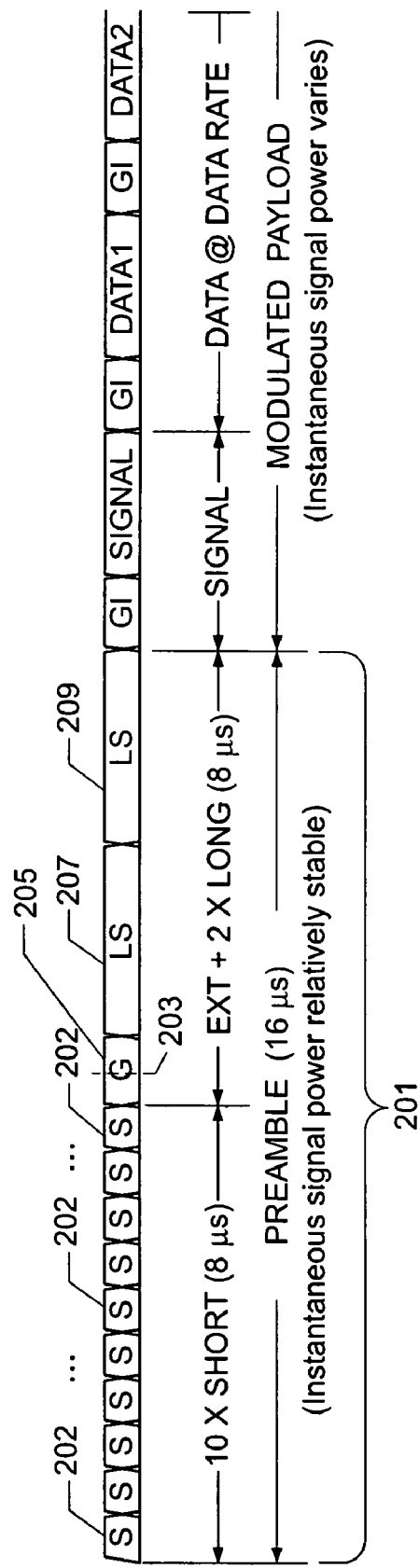
FIG. 2 shows a typical OFDM packet that conforms to the IEEE 802.11a standard and that includes a preamble with a short and a long preamble period that precede the signal payload.

One embodiment of the invention is applicable to communicating using OFDM packets that conform to the OFDM variants of the IEEE 802.11 standard. FIG. 2 shows the structure of an OFDM packet as used in IEEE 802.11a WLANs. The packet starts with a preamble 201 used for SOP detection, AGC, diversity selection when diversity is used, and various other synchronization functions, including initial timing estimation as described herein. The preamble is followed by the modulated payload, which starts with a known (low) data rate SIGNAL field and DATA fields. Each data field includes a guard interval (cyclic extension).

The preamble 201 is 16 μs long and has two 8 μs parts: a first part ("short preamble part") consisting of set of 10 short symbols 202, and a second part ("long preamble part") consisting of two long symbols 207 and 209, and a cyclic extension part (guard interval) 205. In a typical system, the short preamble part provides for the SOP detection, AGC, diversity selection when diversity is used, coarse frequency offset estimation and timing synchronization, while the long preamble part then provides' for channel estimation and fine frequency offset estimation.

The short symbols only use 12 subcarriers, while the long symbols have energy in all 52 subcariiers used in the OFDM signals.

In order to provide enough time for further preamble processing, SOP detection needs to be detected within about 2 μs, i.e., within 3 or so short symbols into the short preamble period. The initial timing (also called exact SOP time) also needs to be determined, but can be determined later than the detection of the SOP.

The Modem with an SOP Detector and an Initial Timing Determining Circuit.

Figure 3:
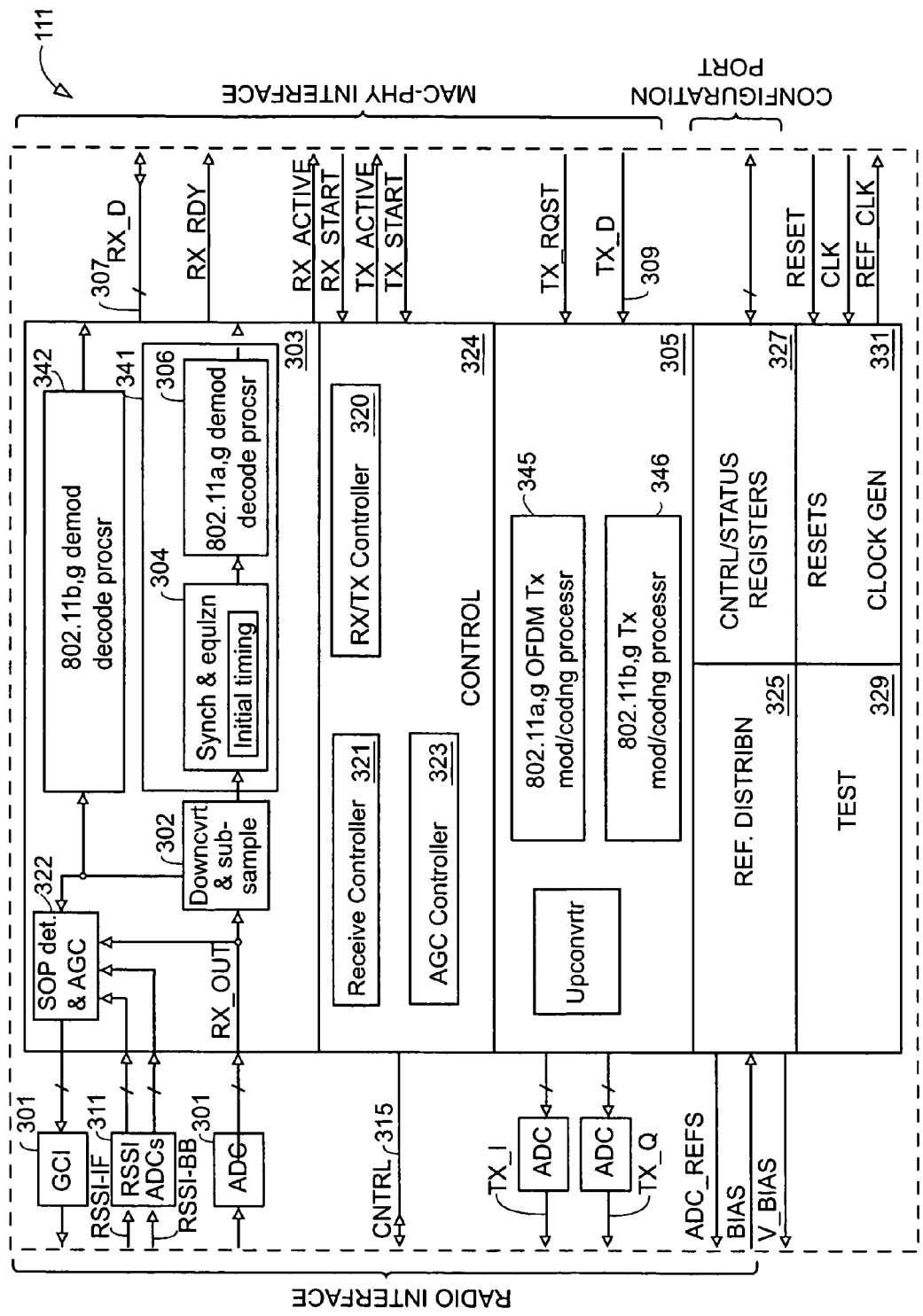
FIG. 3 shows the modem the wireless network node of FIG. 1 in more detail.

FIG. 3 shows the modem 111 of FIG. 1 in more detail. The modem, 111 is implemented as a single chip and includes a controller 324 that controls the different states of the receiver (receive controller 321) the operation of the automatic gain control circuit (AGC controller 323), and receive/transmit control (Rx/Tx controller 320) for controlling the function of the modem under control of the off-chip MAC controller and that provides status signals to the off-chip MAC controller 119.

The modem accepts analog baseband signals. "Baseband" in this context includes low intermediate frequency signals that may need further downconversion. In one embodiment, the baseband signal is a low-IF signal from 10 to 30 MHz. An ADC 301 accepts the analog signal from a transceiver such as radio transceiver 109 and digitizes them at a sampling rate of 80 MHz. The receive signal processor 303 accepts the digitized receive signals from the ADC 301 and downconverts the signals in downconverter 302 to I, Q baseband signals. The downconverted baseband signals, subsampled to a 20 MHz sampling rate, are then subject to the signal processing operations needed to produce demodulated signals. The implementation shown includes an IEEE 802.11a compliant receive signal processor 341 and an 802.11b-compliant receive signal processor 342 to provide for processing signals that conform to the OFDM 802.11a or 802.11g variants of the IEEE 802.11 standard, and to the DSSS/CCK 802.11b,g variant of the IEEE 802.11 standard. The combination of receive signal processors 341 and 342 provide an IEEE 802.11g-compliant receive processor. The processed data output 307 from the receive signal processor 303 is coupled to an off-chip MAC processor such as MAC processor 119, generating and passing the received data of a packet to the MAC processor 119. In one embodiment, additional information also is passed on to the MAC layer processor, including information about the packet. Status information also is provided to the MAC processor via registers 327 in the modem 111.

The OFDM receive signal processor 341 includes a synchronization and equalization processor 304 that carries out synchronization and equalization, including carrying out an FFT operation to determine the subcarriers, and including carrying out initial timing determination, according to aspects of the present invention, to provide for the initial timing for the FFT operation.

A to-be-transmitted signal 309 from the MAC processor 119 is input to a transmit signal processor 305 that performs modulation and other signal processing to provide digital I- and Q-signals that are converted to analog I- and Q-signals by a pair of digital-to-analog converters. These analog signals are input to the transmitter input of the transceiver 109. The transmit signal processor 305 includes an IEEE 802.11a,g-compliant transmit signal processor 345 and an 802.11b,g-compliant transmit signal processor 346.

In one embodiment, operation of the modem 111 is controlled and monitored by a set of control and status registers 327 that, in one embodiment, are 16-bits each and accessed via Serial Peripheral Interface (modem SPI), or in another embodiment, a parallel bus.

The receiver part of the modem is controlled by the control block 324 that includes a receive controller 321 for controlling the different states of the receiver part, and an automatic gain control (AGC) controller 323 for dynamically setting the gains to maximize the performance of the transceiver.

The receive signal processor 303 includes a start-of-packet (SOP) detector/AGC circuit 322 under control of the receive and AGC controllers 321 and 323. The SOP detector/AGC controller 322 accepts the received low-IF signal, downconverted I,Q signals, and received signal strength indication signals from a pair of ADCs 311 to convert analog RSSI values (RSSI-IF and RSSI-BB) from different parts of the receive chain 106 of transceiver 106. The SOP detector/AGC controller 322 also is coupled to the initial timing determining circuit that operates according to one or more aspects of the invention.

The modem 111 also includes a reference distribution subsection 325 to provide various reference currents and voltages to the converters, a test subsection 329, and a reset/clock generation subsystem 331.

The modem 111 also includes a modem gain control interface (GCI) that outputs gain parameters, e.g., in the form of sets of gain control bits to a matching gain control interface in a radio receiver such as that of transceiver 109.

In one embodiment, the modem gain control interface also provides a mechanism for controlling the transmit power level of a radio transmitter connected to the modem by selecting from one of a set of configurations for the power amplifier of the transmitter.

Operation of the Receive Chain

Operation of the receive chain is now described in more detail.

Initially, the AGC controller 323 controls SOP detector/AGC circuit 322 to set a default gain and waits for a packet to arrive, as signaled by a start-of-packet (SOP) event detected by the SOP detector/AGC circuit 322. The default gain setting sets the gains of each section to allow packets having a broad range of signal strengths to be detected reliably. Initially, the SOP detector/AGC circuit 322 waits for a start event such as a threshold exceeded in one or more of the RSSI values to indicate a possible start of packet. Embodiments of the SOP detecting are described in more detail below.

Once the initial SOP event occurs, the AGC controller 323 sets the gains of the receive chain in the transceiver according to the RSSI values to maximize the signal-to-noise-and-distortion at the ADC output. A further AGC stage uses digitized signal values to further set the gain of the receiver.

Initial timing determination is now carried out to refine the start time. Such initial timing determination is the subject of the description herein. Once the initial timing is determined, the modem 111 now continues to process the data part of the packet, starting the with PLCP header in the case of an OFDM packet. Timing may be adjusted during such processing, e.g., using pilots.

Operation of an embodiment of the AGC controller uses a finite state machine (FSM) and is described in more detail in U.S. patent application Ser. No. 10/622,175 filed Jul. 17, 2003 to inventors Adams, et al., titled "ADAPTIVE AGC IN A WIRELESS NETWORK RECEIVER." Such U.S. patent application Ser. No. 10/622,175 is incorporated herein by reference.

SOP Determination

The method of detecting the SOP, and the SOP detector part of SOP detector/AGC circuit 322 are now described in more detail. The detecting from the received signal uses at least one SOP detection criterion. Depending on the SOP detection method, the SOP event nominally occurs within the first 1.6 μs of an OFDM packet.

One embodiment uses the RSSI-BB signal for SOP detection in a method similar to that disclosed in U.S. patent application Ser. No. 10/095,668 to Ryan et al., filed Mar. 8, 2002, and titled AUTOMATIC GAIN CONTROL AND LOW-POWER START-OF-PACKET DETECTION FOR A WIRELESS LAN RECEIVER, incorporated herein by reference.

In another embodiment, the detecting of the SOP includes using at least one of: detecting a threshold being exceeded by the average received signal power, detecting a threshold being exceeded by the average power rise of the received signal, and detecting a threshold being exceeded by a measure of the quality of the correlation of the input signal with a known part of the preamble. In another version, another possible criterion is detecting a threshold being exceeded by a weighted sum of the measure of the average received signal power and the measure of the correlation of the input signal with the known part of the preamble.

In another embodiment detecting the SOP includes for each of the types of packets that are supported, e.g., for each of an OFDM 802.11a,g packet and a DSSS/CCK 802.11b,g packet, determining a logical function of a set of logical indicators including: that a threshold was exceeded in the average received signal power, that a threshold was exceeded in the average power rise of the received signal, and that a threshold was exceeded in a measure of the quality of the correlation of the input signal with a known part of the preamble. In one version, the set of logical indicators further includes that a threshold was exceeded in a weighted sum of the measure of the average received signal power and the measure of the correlation of the input signal with the known part of the preamble.

One embodiment includes using an optional low-power circuit that detects a threshold being exceeded by the received signal power.

Figure 4:
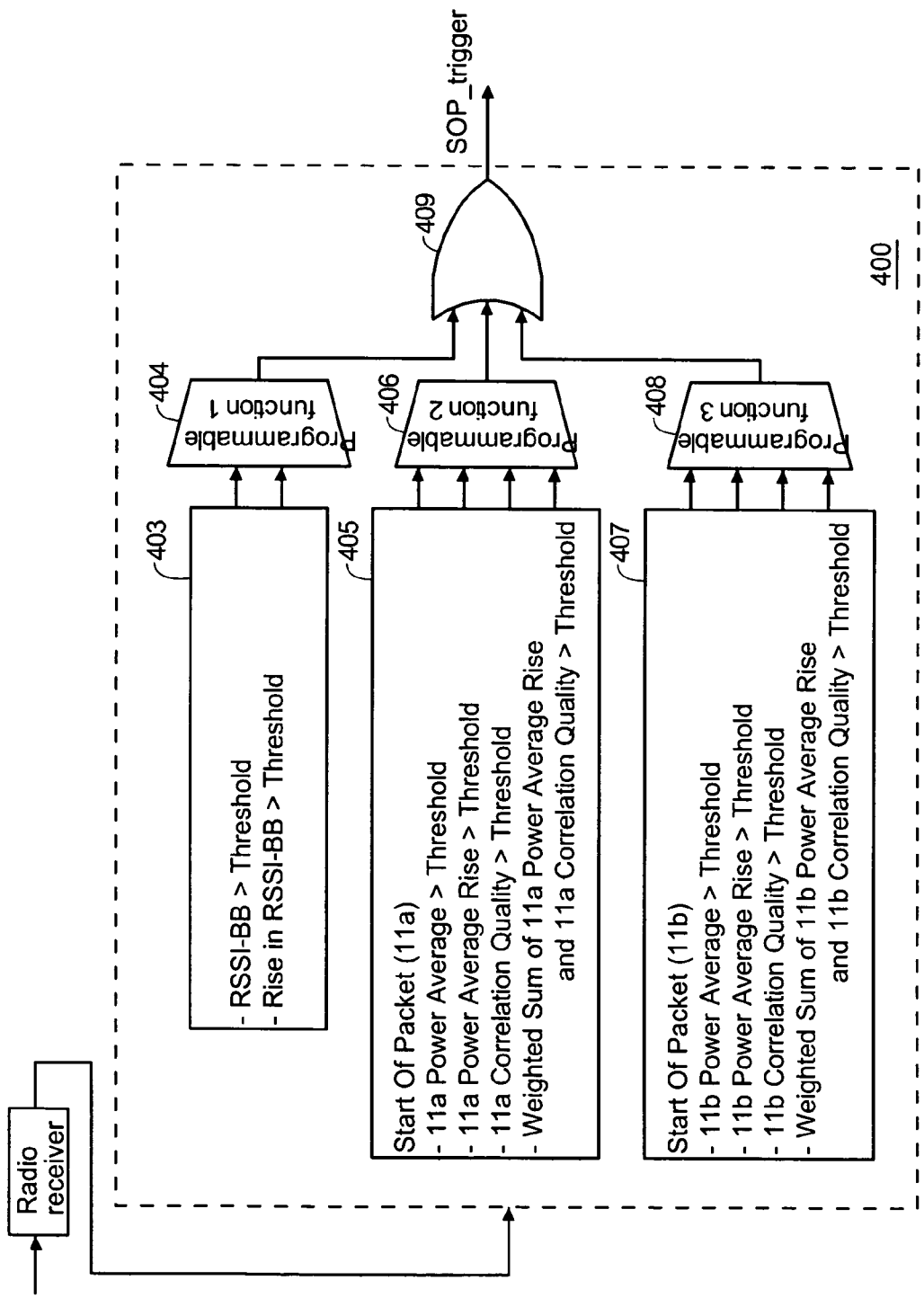
FIG. 4 shows an embodiment of start of packet (SOP) detector that is coupled to the radio receiver of the transceiver of FIG. 1.

FIG. 4 shows a SOP detector 400 that is coupled to the radio receiver of the transceiver. The signals that are accepted by the SOP detector 400 include the digitized RSSI-BB values (from the RSSI-BB ADC 311) and the I,Q samples from the ADC 301, but these are shown as single input from the radio receiver in FIG. 4 in order not to obscure the operation.

SOP detector 400 includes detection circuit 403 for detecting whether an average of the digitized analog RSSI signal (RSSI-BB) exceeds an RSSI threshold, and whether the rise in the digitized analog RSSI signal (RSSI-BB) exceeds an RSSI-rise threshold. The average power rise is the averaged RSSI-BB subtracted from a delayed average. The delayed average nominally estimates the quiescent noise power since it is assumed to occur before the start of packet.

In one embodiment, the RSSI-BB values are converted half dB values. In circuit 403, the RSSI-BB and RSSI-BB rise are each compared against programmable thresholds that can be stored in the register set of modem 111.

The logical results of comparing the two RSSI-BB SOP signals against their respective programmable thresholds may be arbitrarily logically combined via a programmable function 404 implemented in one embodiment as a lookup table that can be stored in the register set of modem 111.

In use, the detection circuit 403 is used for a low power implementation. In other embodiments, the programmable function 404 is such that the detection circuit 403 is not used for SOP detection.

The SOP detector 400 further includes at least one detection circuit each generating a set of SOP indicators. A circuit is included for each of the type of packets that the receive processor supports. One embodiment of each circuit generates indicators indicating that a threshold was exceeded in the average received signal power; that a threshold was exceeded in the average power rise of the received signal; that a threshold was exceeded in a measure of the quality of the correlation of the input signal with a known part of the preamble; and that a threshold was exceeded in a weighted sum of the measure of the average received signal power and the measure of the correlation of the input signal with the known part of the preamble. Other embodiments include a detection circuit generating fewer indicators.

The SOP indicators may be arbitrarily logically combined via a programmable function.

The SOP detector 400 includes one such detection circuit 405 that generates SOP indicators for detecting the SOP for a packet conforming to one of the OFDM variants of the IEEE 802.11 standard, and another detection circuit 407 to generate a set of SOP indicators for packets conforming to the IEEE 802.11b standard.

The thresholds are settable via the resister set of modem 111.

Only the SOP indicators for the OFDM variants of the IEEE 802.11 standard (called the 11a SOP indicators herein) are discussed in any detail. The indicators for the 802.11b conforming packet are similar.

In one embodiment, the 11a SOP indicators all involve some form of averaging, and the averaging duration is set by a configuration register use_2sym_for_corr_11a of the set of registers of the modem 111. When use_2sym_for_corr_11a is de-asserted, the 11a SOP indicators use one short symbol duration (800 ns) of data or one short symbol with respect to one earlier short symbol. When use_2sym_for_corr_11a is asserted, the 11a SOP indicators use two short symbol durations of data or two short symbols with respect to two earlier short symbols. Note that we found that using two short symbols offers greater sensitivity but using one short symbol allows more time for more AGC loops or improved frequency estimation.

Figure 5:
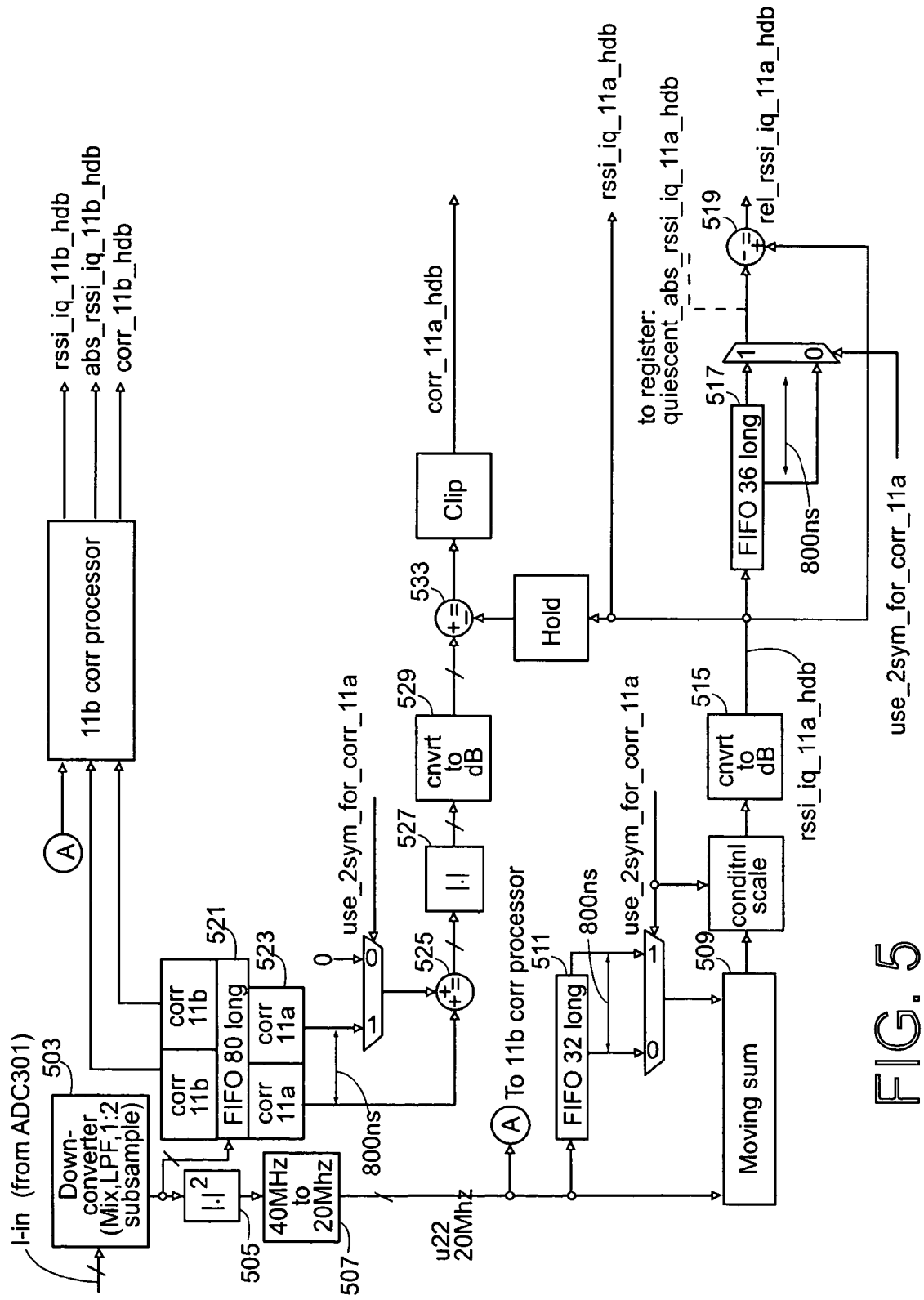
FIG. 5 shows one embodiment of a circuit that determines quantities used as SOP indicators in the SOP detector of FIG. 4.

FIG. 5 shows one embodiment of a circuit that determines quantities used as SOP indicators. A downconverter 503 downconverts the 80 MHz samples to baseband I,Q signals at 40 MHz.

The instantaneous power of the downconverted input signals is obtained by a squared magnitude circuit 505 and the power signals converted to 20 MHz samples.

The instantaneous input power is averaged in two stages over 1 short symbol (800 ns) if use_2sym_for_corr_11a is false or two short symbols (1600 ns) if use_2sym_for_corr_11a is true. The first stage uses moving sum circuit 509 to sum odd 20 MHz samples with even 20 MHz samples. The second stage averages this 20 MHz pair-wise sum over one or two short symbols.

The resulting average input power is converted to a dB scale with 0.5 dB resolution using a dB converter circuit 515 to generate rssi_iq_11a_hdb, the average power.

The 11a average power rise is constructed by delaying the 11a average power by its averaging length plus 200 ns, i.e. 1000 ns or 1800 ns if use_2sym_for_corr_11a is false or use_2sym_for_corr_11a is true, respectively, using a FIFO 517. A subtractor 519 subtracts the delayed 11a average power from the 11a average power to generate the average power rise rel_rssi_11a_hdb in units of 0.5 dB To generate the 11a correlation quality signal, the down-converted signals are input to a FIFO 521 that is coupled to a correlator 523 includes a pair of one-symbol correlators. The correlator 523 correlates the input signal at 40 MHz over one short symbol if use_2sym for_corr_11a is false or two short symbols if use_2sym_for_corr_11a is true. In the latter case the outputs of the two- and one-symbol correlators are added by adder 525 to form the correlation signal. A magnitude circuit 527 computes the correlation magnitude and a logarithmic converter 529 converts the magnitude to a correlation power in a dB scale with 0.5 dB resolution.

In one version; the measure of the correlation quality is a comparison measure of the instantaneous correlation power with the average correlation power in the recent past. In another version, the measure of the correlation quality is a measure of the correlation power normalized by the power of the received signal. FIG. 5 uses the latter. A subtractor 533 calculates the correlation quality corr_11a_hdb as the correlation power normalized by the 11a average power in units of 0.5 dB.

The weighted sum of 11a average power rise and 11a correlation quality is constructed by scaling the correlation quality by a selectable scaling factor then adding the scaled correlation quality to the 11a average power rise.

Figure 6:
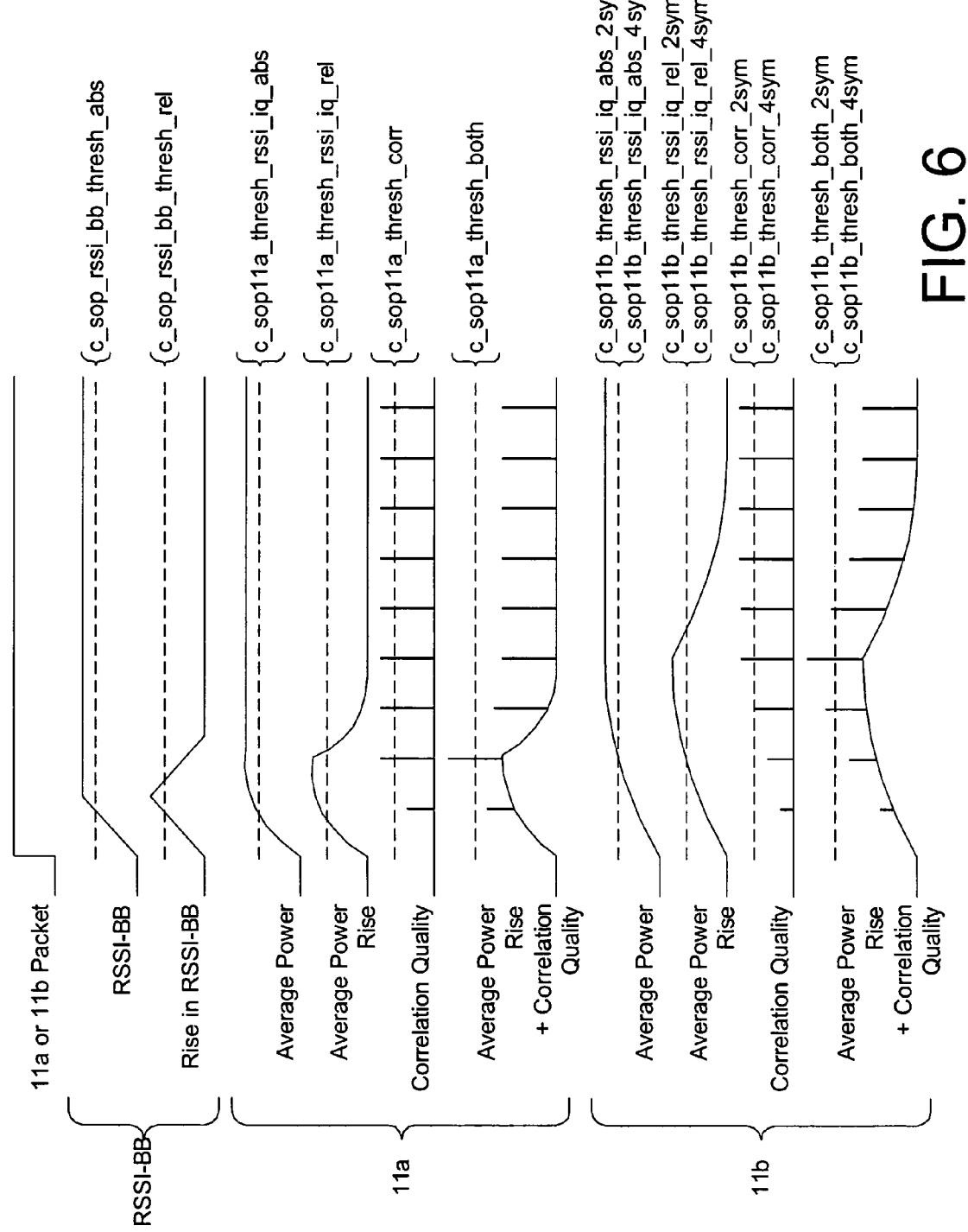
FIG. 6 shows idealized waveforms for the SOP signals used by an embodiment of the SOP detector.

FIG. 5 does not show the details of determining the 11b SOP signals, and the circuits are essentially similar to those for determining 11a SOP signals. FIG. 6 shows idealized waveforms for the SOP signals.

At the same time as the SOP signals are generated, sop_rssi_iq_quiescent_hdb is captured and stored in a register buffer as part of the register set of the modem 111. sop_rssi_iq_quiescent_hdb is the power average delayed by 1000 or 1800 ns obtained from the FIFO 517. In this way, the average signal power is measured well before the packet is detected and nominally immediately before the packet arrives, so sop_rssi_iq_quiescent_hdb should reflect the power of the noise on the medium. sop_rssi_iq_quiescent_hdb is updated whenever the SOP circuit detects an apparent packet.

In an alternate embodiment, since a packet may be detected several μs after the packet begins, the logic maintains a buffer of quiescent noise powers and reports the oldest one when a packet is detected. In one buffer implementation, the reported quiescent noise power is between 8 and 12 μs before the packet is detected, which is almost certainly noise only.

In one embodiment, sop_rssi_iq_quiescent_hdb is used to determine the CNR (see later).

Candidate Metrics for Determining Initial Timing

The initial timing determining method includes determining a plurality, of metrics from the received signal, and using at least two of the plurality of metrics to determine an initial timing for a received packet. Different versions combine the metrics in different ways to determine the initial timing.

Figure 7:
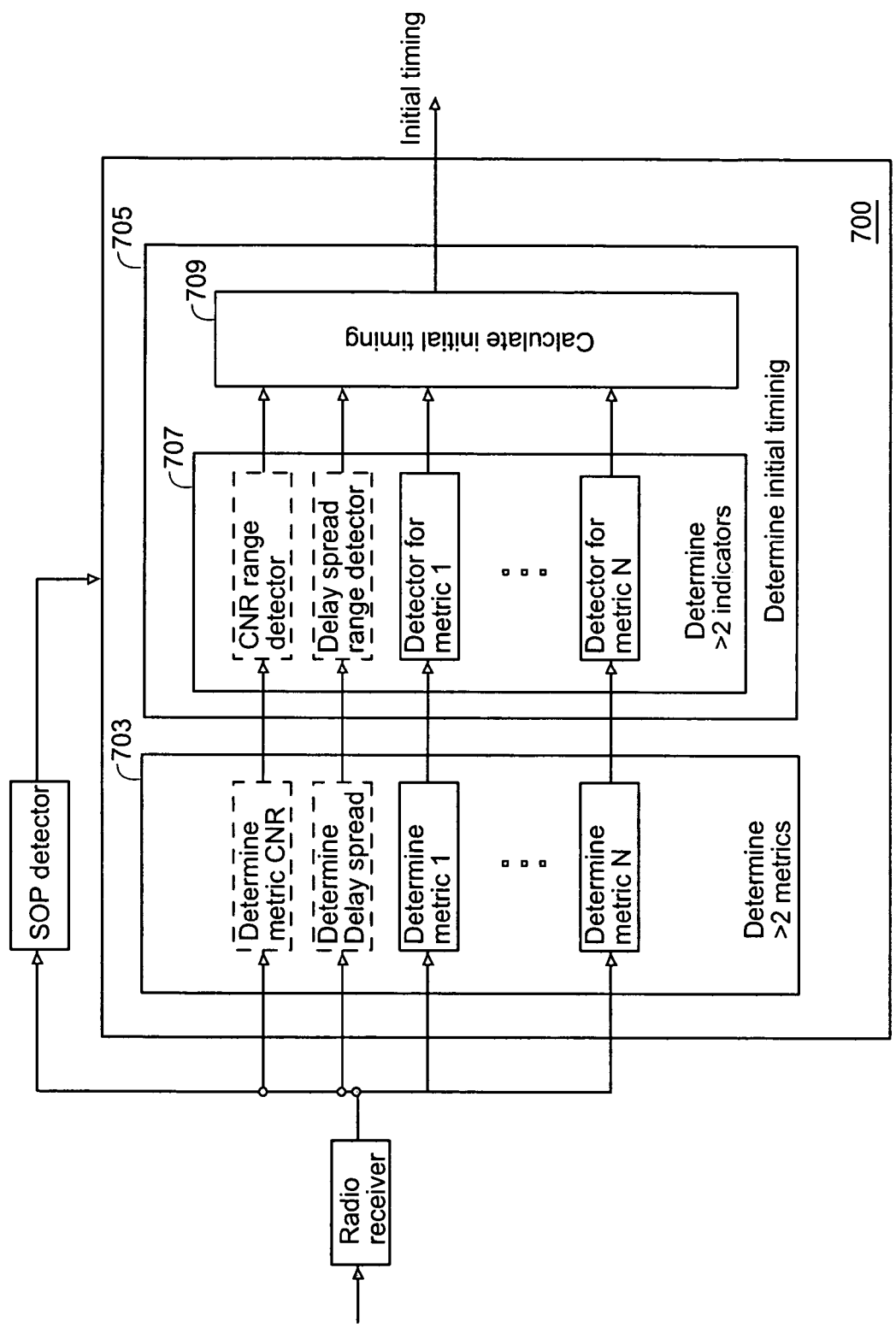
FIG. 7 shows an embodiment of an apparatus that implements the method of determining the initial timing.

According to embodiments described herein, the preamble of the packet according to the wireless networking standard, e.g., IEEE 802.11a, has a first part that includes a series of periodic symbols and a second part. FIG. 7 shows an embodiment of an apparatus 700 that implements the method. The apparatus includes a circuit 703 that determines at least two of the following metrics: a measure of the carrier to noise ratio (CNR), a measure of the received signal power, a measure of the autocorrelation of the input signal at the period of the symbols, a measure the correlation of the input signal with at least one of the short symbols, and a measure of the correlation of the input signal with the start of the second part of the preamble. In the case of the standard using OFDM packets, e.g., e.g., IEEE 802.11a, the metrics of which at least two are determined further include: a measure of the short-term power spectral density of the received signal, and a measure of interference between OFDM symbols.

In an alternate embodiment, the set of metrics of which at least two are determined includes a measure of the delay spread.

FIG. 7 includes a circuit 705 that determines the initial timing. Determining the initial timing uses at least two indicators of the set of indicators that includes:
  whether or not a measure of the carrier to noise ratio (CNR) is within a CNR range;
  that a threshold was exceeded by a measure of the received signal power that exceeds a signal power threshold, with the maximum rate of change of power indicating an SOP time;
  that a change was detected in, e.g. by a range being reached by a measure of the autocorrelation of the input signal at the period of the symbols;
  that a threshold was exceeded by a measure of the correlation of the input signal with at least one of the short symbols;
  that a range was met in a measure of the correlation of the input signal with at least one of the short symbols, e.g., with the start of the first part of the preamble, this being during the short-to-long symbol transition;
  that a threshold was exceeded by a measure of the correlation of the input signal with the start of the second part of the preamble.

In the OFDM case, the set of indicators includes:
  that a change was detected in, e.g. by a range being reached by short-term power spectral density of the received signal, and
  that a fall was detected in a measure of interference between OFDM symbols.

Thus, the circuit 705 that determines the initial timing includes a circuit 707 to generate at least two indicators. Circuit 707 includes a plurality of detectors, e.g., a detector for the range of the CNR if the CNR is determined and/or a detector for the range of the delay spread if the delay spread is determined, and detector(s) for any other indicator(s) that are determined.

The apparatus 700 includes an initial time calculator that implements the calculation of the initial timing. Circuit 709 calculates the timing from at least one of:
  the time a measure of the rise in the received signal power peaks to indicate an SOP time, in particular, the time the maximum rate of power change occurs as determined from a measure of the average power rise, being the averaged power subtracted from a delayed average;
  the time a measure of the autocorrelation of the input signal at the period of the symbols changes to indicate the time of the end of the series of periodic symbols;

the time a measure the correlation of the input signal with at least one of the short symbols reaches peaks, the time a measure the correlation of the input signal with at least one of the short symbols stops producing peaks, the time a measure of the correlation of the input signal with the start of the second part of the preamble peaks to indicate the time of the start of the second part;

in the case of OFDM packets, the time a change is ascertained to occur in the short term power spectral density of the received signal, in particular, the time that energy starts appearing in the subcarriers not used in the short symbol part of the preamble;

in the case of OFDM packets, the time shift determined during the long symbols that produces minimum interference between OFDM symbols, e.g., the time shift in the channel impulse response determined during the long symbols that produces minimum interference between OFDM symbols.

The metrics, indicators, and timings available for initial timing determination are now discussed in more detail for the case of a packet conforming to one of the OFDM variants of the IEEE 802.11 standard. The following information is available for initial timing determination:

The RSSL jump at the start of packet.

The first peak in the correlation of the received signal with the short symbol.

A drop in the correlation peaks of the received signal correlated with the short symbol.

A drop in the autocorrelation of the received signal in the short symbol interval as detected, e.g., by an inverse measure of the autocorrelation exceeding a threshold.

Detect the transition between the short and long symbol part of the preamble by performing a correlation of the received signal with the first guard interval and a threshold to detect the correlation peak.

The first peak in the correlation with the long symbol.

Rise in the autocorrelation of the signal in the long symbol part of the preamble, as detected, e.g., by a measure of the autocorrelation exceeding a threshold.

A change in the short-term power spectral density from short to long symbols, as indicated by appearance in energy in the subcarriers not used in the short symbols but used in the long symbols;

The time shift in the channel impulse response determined during the long symbols that produces minimum interference between OFDM symbols.

Each of these is now discussed.

The Relatively Sudden Rise in RSSI at the Start of Packet.

Above-mentioned incorporated by reference U.S. patent application Ser. No. 10/095,668 describes one method of how to use the relatively sudden rise in RSSI at the start of packet as the start of packet trigger, and also how such a measure can be refined. For a received packet conforming to the IEEE 802-11b standard, the time for the packet energy to rise from 10-to-90% may be as wide as 2 μs. We have found that this is too wide for accurate initial timing determination.

For a received packet conforming to one of the OFDM variants of the IEEE 802-11 standard, e.g., the IEEE 802.11a or .11g, there is no parameter specified for the time for the packet energy to rise, but presumably it should be under 2 μs. The inventors decided not to rely on this to be short enough. Using our lab equipment (e.g. a multi-purpose vector signal generator (SMIQ), manufactured by Rhode and Schwarz), at relatively high carrier-to-noise ratio (CNR), the inventors found a pre-packet "pedestal", where the RSSI level jumps up 1-2 μs before the packet actually begins. They then observed the RSSI jumping up again when the packet truly begins. Note that one embodiment of the AGC of the modem shown in FIG. 3 is described in above referenced incorporated-by-reference U.S. patent application Ser. No. 10/622,175. One version of that AGC method includes the AGC process starting as soon as a rise in RSSI is detected. The inventors decided that there is a very limited window to accurately determine when the RSSI jumped most quickly. The inventors also were reluctant to change the AGC settings to help out initial timing estimation. We therefore decided to use the RSSI rise or a combination of RSSI and correlation-based signals to generate an initial SOP trigger, but also to seek a method of make the accurate initial timing determination that is independent of the RSSI jump at the start of packet.

Position of the First Short Symbol Correlation Peak (Called the FirstCorr Method Herein).

The preamble of an 802.11a packet is known in advance. Thus, one method for detecting the SOP time correlates the input with one or more short symbols and the location in time when the correlation crosses a threshold is determined, i.e., a matched filter is used.

One embodiment of the modem 111 includes a correlator that correlates the input samples with the short symbol. The correlator works on samples digitized using the ADC 301 once the initial AGC is coarsely set so that the input signals are within range of the ADC 301.

The circuit shown in FIG. 5 includes a short symbol correlator that can determine the correlation quality signal whose peak can be used to determine the initial timing. An alternate embodiment uses a separate short symbol correlator for the initial timing determining.

However, the SOP trigger generated as described above is such that the reception of a packet may start on a power rise, on the first short symbol correlation peak, on both the first and the second short symbol correlation peak, or on some combination, e.g., weighted sum, of power rise and correlation quality. What actually starts such a receiver is not clear. For instance, for an arriving packet with a relatively high CNR, the AGC probably adjusts the gain before any correlation peaks are seen. For these reasons, and for the main embodiment described herein, we decided that using the first short symbol correlation peak is not really suitable for initial timing determination. In an alternate embodiment that uses a start event whose source is more clearly identifiable, e.g., based on power rise only, the first short symbol correlation peak may be a suitable metric.

Drop in the First Short Symbol Correlation Peak (Called the CorrDrop Method Herein)

In one embodiment, the short to long preamble transition uses a correlator with the guard interval. An alternate detector for the short to long preamble transition does not use a separate guard interval correlator. The short symbol correlator is used for such transition detection. So long as the short preamble part is being processed, the short symbol correlator produces periodic peaks. After a peak, if at least one peak is no longer produced at the expected time instants, then a signal is generated to indicate that the packet is not in the short preamble part. The position of the last short symbol correlation peak is used to determine the start of the long preamble part.

Using the short symbol correlator, e.g., that of FIG. 5 or a separate short symbol correlator, the CorrDrop method includes correlating the digitized signal over 1 or two short symbols, averaging (in the case of two correlations), finding the correlation peak, and examining the position of the peak repeatedly, e.g., every 800 ns, the period between short symbols, until there is a noticeable drop in the correlation. The time of the sudden drop provides a measure, possibly with a delay, of the end of the short correlation period.

Drop in the Short Symbol Autocorrelation (Called the Autocorr Method Herein).

Whatever delay spread is caused by delay spread, the short symbols look periodic, with an 800 ns period. Thus the autocorrelation of the input at the short symbol period should be constant during the short symbol preamble. The short-to-long symbol transition can be detected by a degradation in the periodicity of the input as reflected by a change of the autocorrelation determined at the short symbol period. The Autocorr method includes obtaining a measure of the autocorrelation of samples of the input signal at a time value of 800 ns, the period between short symbols, then searching for a change in this autocorrelation.

Many methods are available for determining the autocorrelation, and the invention is not restricted to any particular method or apparatus that implements the method. In one embodiment, to determine the autocorrelation, one embodiment includes multiplying each input signal sample (sampled at 20 MHz) by its 800 ns delayed complex conjugate, converting from rectangular to polar coordinates, the samples being provided in rectangular coordinates—also called "I,Q", "quadrature components" and "rectangular complex numbers" herein—and determining the departure of the measure of the autocorrelation from a positive real number or determining the modulo absolute value of the phase. Note that for signals sampled at 20 MHz, 800 ns corresponds to 16 samples.

Because the short and long symbols are expected to have approximately constant amplitude, the significant part of the autocorrelation is the difference between the phases of the signal and its 800 ns delayed version. In one embodiment, to make the calculation level-independent—hence independent of the AGC—and to reduce its complexity, the phase of the signal is coarsely quantized by a phase shift key (PSK) detector, e.g., QPSK, 8PSK or 16PSK detector, to generate a code, e.g., a 0-3, 0-7, or 0-15 code for the QPSK, 8PSK or 16PSK cases, respectively. An error signal is determined as a function of the difference between the detected values and the detected values delayed by 800 ns. The drop in the autocorrelation at the short symbol period corresponds to a rise in the error magnitude. This error signal is then filtered to average out any noise-based variation. Any constant frequency offset is eliminated in the error by the filter impulse response summing to zero, i.e. having zero gain at DC, When the filtered error rises above a settable threshold provides a measure of when the short symbols are finished.

Figure 8:
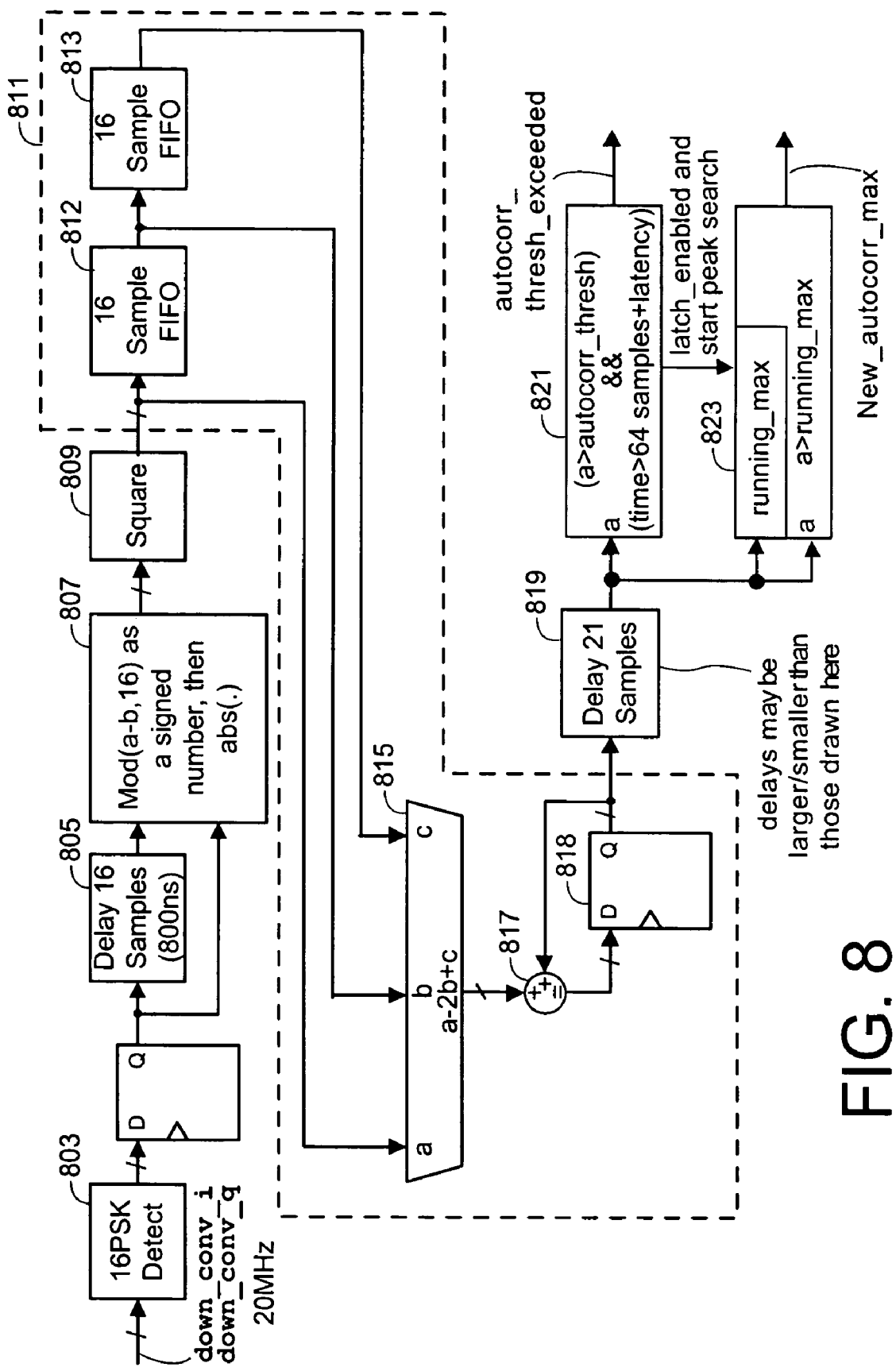
FIG. 8 shows one embodiment of a circuit that calculates the autocorrelation metric and that determines the autocorrelation indicator and timing.

FIG. 8 shows one embodiment of a circuit that calculates the autocorrelation metric and that determines the autocorrelation indicator and timing. The I,Q input signal after downconverting and subsampling to 20 MHz is used. We found that 4 bits of phase for the phase estimation is adequate, so a measure of the phase is determined with an 16PSK detector 803. An 800 ns (16 sample) delay is used to delay the measure of phase and a comparison circuit 807 is used to obtain a measure of the phase difference with the phase from a symbol period time (16 samples) earlier. Now because the phase change of the PSK detected signal varies differently—albeit monotonically—than does the autocorrelation, in one embodiment the error signal is squared by a squarer 809 to account somewhat for the difference in variation. Alternate embodiments can use another monotonic function. A filter 811 is used to average the noise. The filter has an impulse response summing to zero. The filter 811 shown has a finite impulse response 1, 1, . . . , 1, −1, −1, . . . , −1 (i.e. 16-1's followed by 16-1's), and is implemented as an infinite impulse response filter using the two delays 812, 813, the coefficient summer 815 and the integrator using summer 817 and one unit delay 818. The filter output starts to rise at the short-to-long symbol transition, peaks 16 samples later, then tends to taper away again.

A 21 sample FIFO 819 is used to align the output to other metrics that are used. The amount of delay thus may vary depending on the embodiment.

FIG. 8 also shows a circuit 821 for determining the Autocorr indicator, i.e., determining whether the Autocorr exceeds a settable threshold denoted autocorr_thresh. In one embodiment, the autocorrelator is only fed by samples after sop_trigger is set by the SOP detector. There thus is a latency before the autocorrelator and filter have reached steady-state. The comparison circuit disallowed the indicator signal before this time as unreliable, i.e., until time>48 samples+latency.

Once the threshold is reached, the peak is stored in unit 823 and a search is started for a new peak until a peak is found.

Note that while one embodiment uses the averaging filter shown in FIG. 8, an alternate embodiment uses a median filter in place of a FIR or IIR filter. It was decided however that a median filter would be too complex for today's technology.

Short to Long Transition Time Correlation Peak (called the Corr_GI Method Herein)

Referring again to FIG. 2, in the absence of multipath, the transition 203 in an IEEE 802.11a preamble 201 from the short preamble part to the long preamble part is distinct.

One method for determining the initial timing detects the location in time of that transition from short to long preamble using correlation with the guard interval. The timing may thus be accurately determined, albeit some time later than the detection of the SOP.

Figure 9:
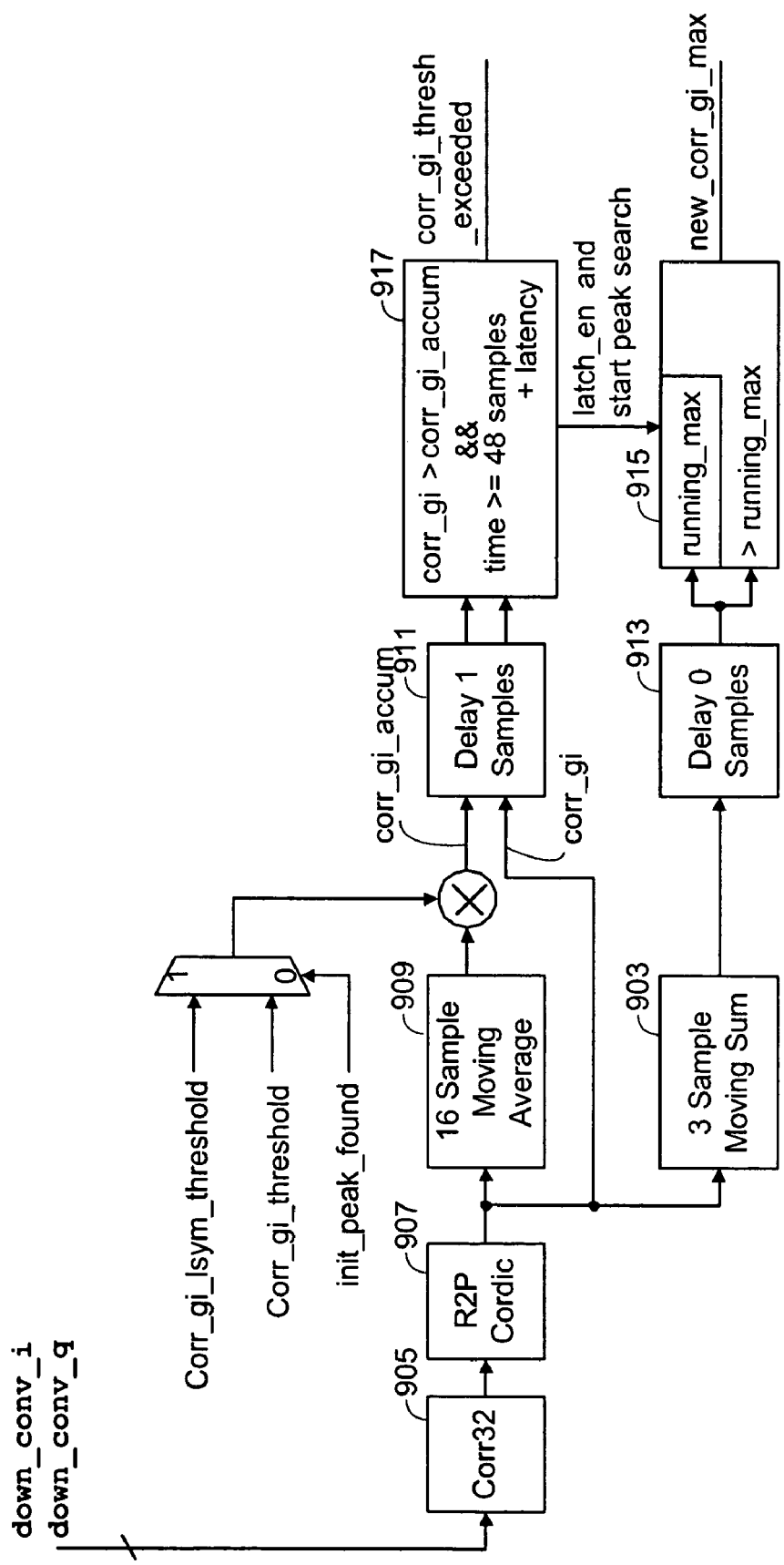
FIG. 9 shows one embodiment of a circuit that determines the Corr_GI metric and the Corr_GI indicator and timing.

FIG. 9 shows one embodiment of a circuit that determines the Corr_GI metric and the Corr_GI indicator and timing. The input is the set of complex (I,Q) baseband signals after downconversion and subsampling to 20 MHz. The Corr_GI correlator 905 correlates the input with the known sample values of 1600 ns, the guard interval. In one implementation, correlator 905 is implemented as a 32-tap FIR filter with the coefficients chosen as the time-reversed, complex conjugated 32 samples of the guard interval GI2 quantized to $\{+\pm1,0\}+j\{\pm1,0\}$, ie. to values of ±1. The correlator 905 includes a scaler (not shown) that scales the output by a settable scale factor. The result is clipped in correlator 905 to a 12-bit value.

Next, sensitivity to channel and carrier phase is removed by calculating the magnitude of the complex correlation output, via a Cordic 907.

The Corr_GI indicator indicates that the correlation has risen by comparing a measure of the correlation quality against a selectable threshold, Corr_GI_threshold. In one embodiment, the correlation quality for Corr_GI is the ratio of the Corr_GI correlation magnitude to the average value of the correlation magnitude. Using the correlation magnitude average as a baseline makes the detection scheme independent of input level, and the selectable threshold allows the test's stringency to be varied.

Once the guard interval indicator is located, the level corr_gi_max is set. A search for a new maximum may now commence.

While different embodiments use different hardware to implement the comparison, in one embodiment, the comparison of peak to average ratio against a threshold is implemented as a comparison between the Corr_GI correlation magnitude and a product of average and threshold. Sixteenfold averaging is implemented in averager 909 as a moving sum followed by a normalization by sixteen.

Since the correlator and moving average units are only fed by samples after SOP_trigger is set by the SOP detector, there is latency before the correlator, Cordic and moving average filters have reached steady-state. The comparison circuit disallowed the indicator signal before this time (time<48 samples+latency) as unreliable.

Once the threshold is reached, as indicated by corr_gi_thresh_exceeded, a pulse is issued and a peak is located. After an initial peak is found, a higher peak is searched for in running max circuit 915, in case the correlation is still increasing. Peak detection uses an averager 903 with a relatively narrow window of 3 correlation samples so that the timing that encloses most multipath energy is identified. The delay 913 is adjusted to equalize the delays in the circuit.

Note that the correlation circuit shown in FIG. 9 is a pragmatic tradeoff between implementation complexity and performance. Those in the art will recognize that the squared correlation magnitude rather than the magnitude may give better detection performance. Similarly, using the average power as the baseline rather than the average magnitude may also improve performance, but at the cost of higher hardware complexity. The invention certainly is not restricted to the particular embodiment of FIG. 9 and alternate embodiments may indeed use a measure of the correlation power rather than correlation magnitude.

We have found the Corr_GI method to be a very effective method for initial timing determination, especially for poor CNR signals in additive white Gaussian noise.

The First Peak in the Correlation with the Long Symbol, and the Rise in the Autocorrelation of the Signal in the Long Symbol Part of the Preamble.

Each of these require a delay that would be too large for most practical applications, so was not considered as a candidate for a metric for initial timing determination.

Change in the Short-Term Power Spectral Density from short to Long Symbols

Another method of detecting the time of transition from the short symbol preamble to the long symbol preamble is to detect a change in the short-term power spectral density. In the short symbol preamble, only 12 subcarriers are whereas the long symbols exercise 52 subcarriers. Therefore, detecting when energy appears at the 40 new subcarriers provides an indication of short-to-long symbol transition. Determining the subcarriers not in the short symbols includes taking a DFT (using an FF operation) of the input signal, selecting the 40 new subcarriers that are known to not be in the short symbols, e.g., filtering those that are in the short symbols, and summing the energy in the subcarriers. Alternatively, the filtering/selecting can be eliminated. The method detects when the short term spectral power spectral density exceeds a threshold. How to calculate a measure of the short term spectral power density using the FFT would be is known to those in the art.

A further embodiment includes a pair of FIR or IIR filters, one with notches at the short symbol tone frequencies, and one with multiple passbands at the short symbol tone frequencies. Timing is determined from the rise in power-on the first filter and the fall in power on the second filter.

Further embodiments include using one filter only, or filters with generally similar transfer functions.

Minimum Interference Between OFDM Symbols.

We have found the following method to be a very effective method for initial timing determination. The method includes determining the (delayed) channel impulse response. In one embodiment, the channel impulse response is determined by discrete Fourier transforming, e.g., using an FFT on part of the long symbol preamble, and dividing the results of the transform by the known subcarriers in the long symbols. The result a measure—likely a noisy measure—of the channel transfer function to within a linear phase slope indicative of the time shift.

Inverse discrete Fourier transforming, e.g., using an inverse FFT on the channel transfer function produces an estimate of the channel impulse response with an unknown delay. The delay is a measure of the timing offset.

In one embodiment, the magnitude of the channel impulse response is filtered by a finite impulse response (FIR) filter whose impulse response approximates a rectangle function with a width of the width of the guard interval, i.e., 800-ns. The peak of the thus filtered impulse response occurs at the correct initial timing (time shift). In the absence of noise, we have found this time estimate produces a good measure of the initial timing. We believe this to be the time shift that produces minimum interference between OFDM symbols. The window corresponding to the peak we believe contains the majority of the multipath energy.

In an alternate embodiment, the filter has an impulse response narrower than 800 ns. IN yet another embodiment, no filtering is included, and in yet another embodiment, the filtering uses other than a rectangle function impulse response, e.g., a triangular impulse response or a doubly exponentially decaying impulse response as an approximation and an approximation to the rectangular impulse response.

In one embodiment, the peak detection logic for the results of filtering distinguishes peaks due to the GI2, LS1 and LS2:

Analysis of the Metrics and Indicators

Which metrics are determined and which indicators are used in the determining of the initial timing are determined either by a priori simulation, by a priori experimentation, or both by simulation and experimentation under a set of different CNR and delay spread conditions.

What Single Metric Works?

One embodiment uses simulations. We examined the probability distribution function (PDF), obtained by simulation, of when the maximum value of the metric occurs for the Corr_GI, RSSI change, CorrDrop, and Autocorr methods. The PDFs were examined for the following range of CNRs: 1, 2.5, 5, 10, 20, 30 dB and for the channels that has the following range delay spreads: 0, 50, 100, 150, 250, 600 ns. Since we were more interested in both tails of the PDF rather than the PDFs themselves, we plotted the cumulative distribution functions (CDF) and 1 minus the plotted the cumulative distribution functions (1-CDF) on a logarithmic scale. For a good metric, we would expect the CDF to go from a low to a high value rapidly around a zero timing error, and (1-CDF) to change from a high to a low value rapidly around a zero timing error.

The results were that nothing worked well in a low CNR and relatively high delay spread. The Corr_GI and CorrDrop methods seemed to work well in additive white gaussian noise (AWGN) channels, but degrade in performance when there is a delay spread. The RSSI change method and Autocorr methods worked reasonably well above 10 dB CNR, but gave inadequate performance in AWGN channels and did not finely resolve the timing.

Can We Select a Threshold for the Metric?

In addition to determining if the methods can determine the initial timing, we also examined whether or not we can select a threshold that prevents false alarms without causing too many missed packets. For this, we examined at the maximum value of each of the metrics during what we expect to be their false alarm and positive detect periods, respectively. For this, we considered the "false alarm period" to mean the short symbol period, and the "positive detect period" to mean a window, "centered" 16 samples into the GI2 for CorrDrop and Autocorr, and "centered" at the end of the guard interval 205 for Corr_GI. That window we selected is −4 to +12 samples relative to the "center" defined as index 0.

We plotted the CDF and 1-CDF during the false alarm period and during the positive detect period, which for correlation methods is the expected peak period, to check that a threshold can be selected that prevents false alarms without causing too many misses.

For the Corr_GI method, we found that with no delay spread, we could achieve outstanding performance in AWGN. However, there was a relatively high miss rate in moderate and long delay spread channels. We attempted to reduce the threshold to decrease the miss rate, but then we found that the false alarm rate increased too quickly. There was no threshold that can keep the miss rate and false alarm rate below 1%.

For the CorrDrop method, we found that with no delay spread, we could achieve outstanding performance in AWGN. However, as in the case of the Corr_GI method, there was a relatively high miss rate in moderate and long delay spread channels. The results were broadly similar to that of the Corr_GI method.

For the RSSI change method, we found that we could achieve outstanding performance in the presence of delay spread with no noise. However, there was a relatively high miss rate as the CNR went down. There was no threshold that can keep the miss rate and false alarm rate below 1% in AWGN and low CNR.

For the Autocorr method, we found that the performance was not outstanding and not bad. Performance was ordinary at low CNR. The packet error rate (PER) can possibly be brought down to 1% in moderate and long delay spread channels. To do this required lowering the threshold in what we called safe circumstances, e.g., the CNR above 10 dB, and/or the delay spread above 100 ns RMS.

We concluded that any one metric alone cannot provide us good performance in all circumstances.

Combining Metrics

One aspect of the invention is determining more than one metric and determining the initial timing using more than one indicator. In one embodiment, a pair of indicators is selected from the set consisting of CorrDrop, Corr_GI, Autocorr, and RSSI change indicators.

Can We Select a Threshold for a Pair of Metrics?

To determine if there are combinable metrics, we ran simulations to see if there are two metrics that are sufficiently independent. We generated plots of the maximum metric values of a pair of metrics for different CNR and delay spreads during the false alarm period, e.g., the short symbol period, and the positive detect period, e.g., the likely peak region in the case of correlation-based metrics. We generated scatter plots of these maximum metrics against each other for the following cases: Corr_GI vs. CorrDrop, Corr_GI vs. RSSI change and Corr_GI vs. Autocorr.

It is desired to have two sets of dots be distinct. If there is a single vertical or horizontal line that can separate the two sets, then one metric is good enough. We had already determined that, based on our simulation, that will not be the case. If there is a line at any angle that can separate the two sets, then a hybrid metric provides good performance in both high delay spread and low CNR.

We selected the following nominal specification: that the performance be satisfactory with 1 dB CNR operation in channels with up to 50 ns RMS delay spread, with 10 dB CNR operation in AWGN with up to 150 ns RMS delay spread, and that there still be some operation in 600 ns RMS delay spread before 30 dB CNR. By "satisfactory" we mean approximately 1% or less miss rate and 1% or less false alarm rate. By "some operation" we mean approximately 3% or less miss rate and 3% or less false alarm rate.

For the hybrid of the Corr_GI and the CorrDrop methods, we found no line that reliably separated the two sets. We decided that the hybrid Corr_GI and CorrDrop metrics are insufficiently independent.

For the hybrid of the Corr_GI and RSSI change methods, we found that there always was a line that could separate the two sets. Therefore a very robust timing detector using a combination of Corr_GI and RSSI timing should be possible. Thus an alternate embodiment uses a hybrid measure of the rise RSSI and the Corr_GI method. For a description how the rise in RSSI may be used alone, see U.S. patent application Ser. No. 10/095,668, titled AUTOMATIC GAIN CONTROL AND LOW-POWER START-OF-PACKET DETECTION FOR A WIRELESS LAN RECEIVER to Ryan, et al, filed: Mar. 8, 2002. Patent application Ser. No. 10/095,668 is incorporated herein by reference.

It was described above that one embodiment of the AGC process of the modem shown in FIG. 3, described in above mentioned U.S. patent application Ser. No. 10/622,175 starting as soon as a rise in RSSI is detected. The gains therefore start to change. Therefore, in one embodiment, using the rise in RSSI as one of the metrics or one of the components of a hybrid metric for accurate initial timing determination was excluded. Such an RSSI rise is instead used to trigger AGC as soon as possible. Thus, an alternate combination was needed for such an embodiment.

For the hybrid of the Corr_GI and the Autocorr methods, the inventors found that there is an oblique line that can distinguish two sets of data for delay spreads of up to 250 ns. However, for 600 ns delay spread, degradation occurs.

We further observed that a threshold of only one of the metrics, the Corr_GI method, works for delay spreads up to 100 ns. For 10 dB CNR and above, we found that again, a threshold of only one of the metrics, the Autocorr method, provides adequate performance. Therefore, one embodiment detects whether the CNR is 10 dB or above, and in such a case adaptively introduces the Autocorr method. In our simulations, we found even at a relatively high delay spread of 600 ns RMS, we were still able to get moderate performance.

Thus, one embodiment uses a first and a second metric, in one embodiment being the Autocorr and Corr_GI metrics, respectively. The method includes detecting whether or not the CNR is in a settable range wherein the first metric is expected to work well, enabling the first metric if the CNR is in the settable range, and determining the initial timing according to location in time of the peak in the first metric or the second metric, the first metric being considered only if enabled.

Note that this is a simplified hybrid metric method, since a logical combination rather than an arithmetic combination of the metrics is used.

In an alternate embodiment, the method includes detecting whether or not the CNR is in a settable range wherein the first metric is expected to work well. If the CNR is in the settable range, the method enables the first metric. The method includes determining the initial timing according to location in time of the peak in the second metric if the CNR is not in the settable range. If the CNR is in the settable range, the method includes determining the initial timing according to location in time of a peak in a weighted combination of the first metric and a delayed version of the second metric, the delay such that the peaks would align in the presence of a packet and no noise and no delay spread.

In yet other alternate embodiments, both the CNR and the delay spread are determined, and the settable range is of both the CNR and the delay spread. A measure of the delay spread may be determined, for example, by using a modification of the Corr_GI circuit of FIG. 9. One implementation coiders the −3 dB width of the correlator output in the Corr_GI circuit, an alternate considers the −1-dB width of the correlator output in the Corr_GI circuit. An an example, one method uses the peak magnitude of correlator output (see below), multiplies the peak magnitude by a factor, e.g., 0.25, to form a threshold, and looks at how far apart the farthest correlator values are that are above this threshold.

Description of One Method in More Detail, and of the Circuit Implementing the Method The initial timing determining method and the circuit are used to determine the exact point within an OFDM symbol to start the FFT.

One embodiment of the method includes detecting whether or not a measure of the CNR is in a CNR range wherein a first metric of the set of determined metrics is expected—e.g., from simulation or experimentation or both—to be effective, and using the first metric for the initial timing determining only if it is detected that the measure of the CNR is in the CNR range. For OFDM variants of the IEEE 802.11 standard, the first metric is the measure of autocorrelation.

Thus, one embodiment includes detecting whether or not a measure of the CNR is in a CNR range wherein it is expected that a change of a measure of the autocorrelation of the input signal at the period of the symbols is effective to indicate the time of end of the series of periodic symbols. The method includes determining an initial timing for a packet using that a threshold was exceeded by a measure of the correlation of the input signal with the start of the second part of the preamble, and further using the time of a peak in the correlation of the input signal with the start of the second part of the preamble. The method includes, if it is detected that the measure of the CNR is in the CNR range, further using that a change was detected in, e.g. by a range being reached by the autocorrelation measure.

Based on our simulations, the range for when the Autocorr is expected to be effective is set as >10 dB, and one embodiment includes determining whether the CNR>10 dB.

Determining the measure of the CNR includes computing the ratio of the received power during the presence of a packet and the received signal power a relatively small time before the packet arrived. In one version, each of the received powers before and after the packet is computed on a logarithmic scale, such that computing the ratio includes subtracting the received power during the presence of a packet and the received signal power the relatively small time before the packet arrived.

Figure 10:
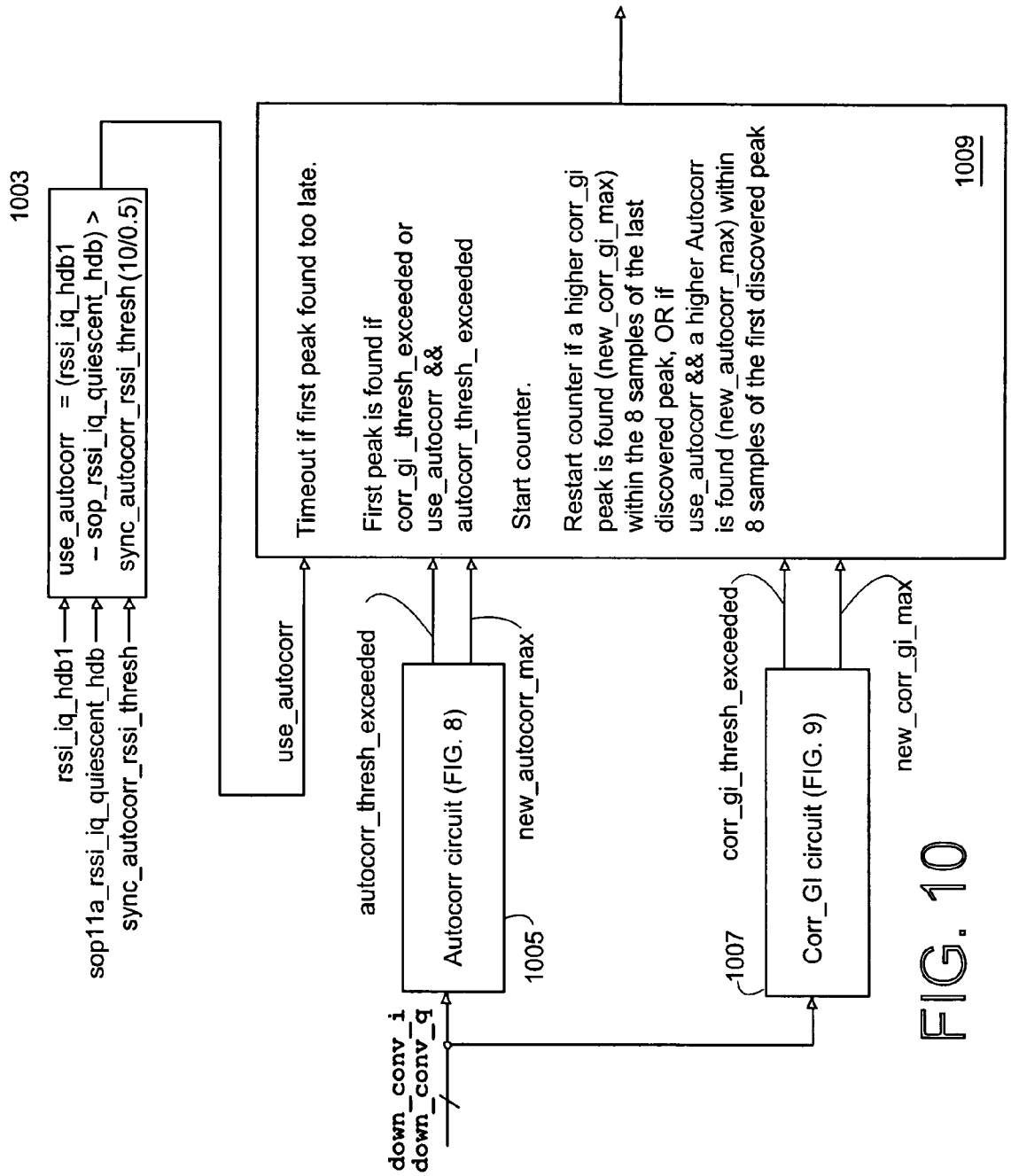
FIG. 10 shows a block diagram of an embodiment of an apparatus that determines the initial timing using Corr_GI and, if the CNR is in a settable range, Autocorr.

FIG. 10 shows a block diagram of an embodiment of an apparatus that determines the initial timing.

Element 1003 determines if the CNR is above a settable range, 10 dB in this embodiment.

Element 1005 acts as an autocorrelation detector and determines the Autocorr metric and the Autocorr indicator indicating that the Autocorr metric has exceeded a settable threshold.

In one embodiment, element 1005 is implemented as shown in FIG. 8 and generates the indicator that the Autocorr has exceeded the threshold and also generates the initial peak value.

Element 1007 acts as an correlation detector and determines the Corr_GI metric by correlating the incoming signal with the known transition—in one embodiment the guard interval of the long symbol period. In one embodiment, element 1007 is implemented as shown in FIG. 9 and generates the indicator that the Corr_GI has exceeded the threshold and also generates the initial peak value.

In one embodiment, the autocorrelation detector is enabled only if element 1003 determines that the CNR is in the settable range, e.g., >10 dB, wherein the Autocorr is useful.

The element 1009 determines the initial timing as follows:

Wait until one of Corr_GI or Autocorr (if enabled because the CNR is within range) exceeds its respective threshold, or time out if no peak is reached within a set time.

If a threshold is exceeded, begin to hunt for new_Corr_GI_max or new_autocorr_max. Each time a new maximum is found, a counter is restarted. The Autocorr can only restart the counter within the 8 samples after the initial peak is found; new_autocorr_max can restart the counter if a new maximum was found within 8 samples of the last maximum.

Note that in one embodiment, Corr_GI is used in two ways: referenced to a scaled average to answer "is there a significant Corr_GI peak present" (the Corr_GI indicator), and directly to answer "given there is Corr_GI peak present, where is its maximum?"

Thus, referring to FIG. 9, the datapath 903 and 913 are used to determine the location of the peak for initial timing determination, and the datapath via 911 and 917 is used to determine the Corr_GI indicator.

Figure 11:
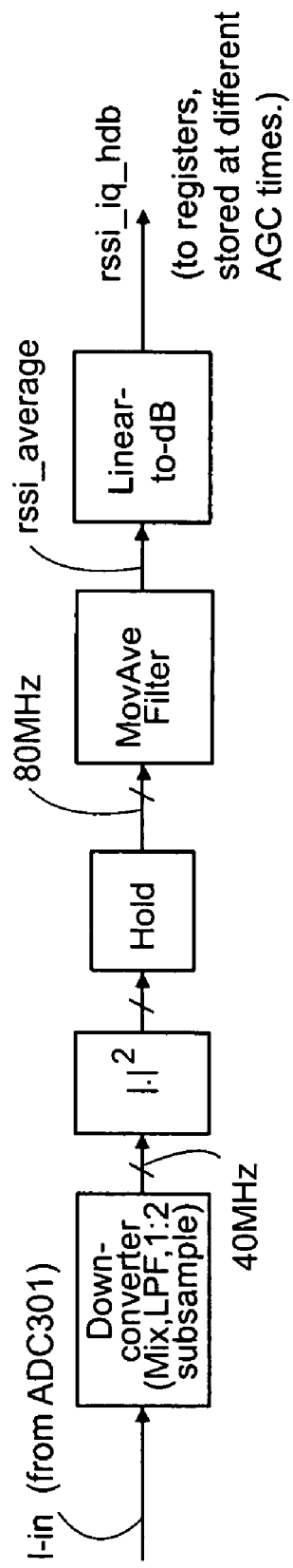
FIG. 11 shows a block diagram of an embodiment of a circuit that determines a measure of the received signal power at baseband.

FIG. 11 shows a circuit 1100 included in modem 111 that outputs a signal that is a measure of the receive signal power at baseband obtained from the analog input entering the modem's ADC 301. FIG. 11 shows how this signal is constructed in one embodiment. The 80 MHz samples from the ADC 301 are downconverted to baseband, filtered to the desired 20 MHz bandwidth, then squared, averaged using a moving average filter having a settable window length, and converted to a dB scale with 0.5 dB resolution. This way estimates the power of the desired (in-band) signal. This method of determining the measure of the baseband signal power is used before the first and after the last AGC stage.

The linear to dB converter uses the conversion
RSSI-IQ=ceil(10(log 10(rssi_average)+6)/0.5) for non-zero rssi_average RSSI-IQ=0 when rssi_average is zero.

In an alternate implementation, the round( ) operator is used. The ceil( ) operator leads to a simpler implementation relative to the round( ) operator. The division by 0.5 converts dB values to a half-dB values, and the +6 term allows inputs of 0 and 1 to be distinguished, by returning 0 and 12 respectively. A full-scale input returns 121.

The rssi_iq_hdb values are recorded in status registers in the modem as unsigned 8 bit values in 0.5 dB steps. This is recorded in different registers of modem 111 at several instants of time corresponding to the different stages of AGC.

Referring to element 1003 and FIG. 11, to determine the CNR, the signal power during the presence of a packet is determined using the I,Q before the first AGC stage of adjusting the radio gains. This, the carrier power, is rssi_iq_hdb1, the RSSI just before the start of the AGC.

As described above, the noise power soplia_rssi_iq_quiescent is a signal that is recorded by the SOP detector.

Element 1003 determines if rssi_iq_hdb1−sop11a_rssi_iq_hdb_quiescent>10/0.5 where the division by 0.5 is to account for the 0.5 dB steps.

Timing estimation is set in element 1009 by a master counter which counts at 20 MHz from 0 starting from the SOP_trigger signal generated by the SOP detector.

Note also that in FIG. 10, the elements 1005 and 1007 include delays that ensure that the change in metric value is aligned, i.e., the indicators occur substantially at the same time.

Another embodiment may be summarized as follows: If the Corr_GI indicator starts the count, use time of the peak in Corr_GI for the initial timing. If the Autocorr indicator indicator starts the count, and there is no Corr_GI indicator using a reduced corr_GI threshold, restart the clock to wait for the Corr_GI indicator. This may be, for example, because the Autocorr may have false triggered off a carrier frequency transient.

Note different embodiments can use different logic in element 1009. One alternate embodiment uses the time of peak of a weighted sum of the Autocorr value and the Corr_GI to determine the initial timing.

Another embodiment includes using the may be summarized as follows: If the Corr_GI indicator starts the count, use time of the peak in Corr_GI for the initial timing. If the Autocorr indicator starts the count, and there is no Corr_GI indicator using a reduced corr_GI threshold, restart the clock to wait for the Corr_GI indicator. This is because the Autocorr16 may have false triggered off a carrier frequency transient.

An alternate embodiment is similar to that shown in FIG. 10, but uses the method described above of finding the initial timing according to the time shift that minimizes the interference between OFDM symbols in place of the Corr_GI method. This alternate embodiment includes determining the channel impulse response to within an unknown delay, and filtering the magnitude squared of the channel impulse response with a filter having an impulse response approximately the width of the guard interval. The location in time of the peak in the filtered channel impulse repose provides the timing estimate.

We have found that using a hybrid method of determining the initial timing works well in practice.

Note that while the above embodiments use special purpose hardware, another embodiment of the modem 111 includes a processor, and one embodiment of the methods described herein is in the form of a computer program that executes on a processing system, e.g., a one or more processors that are part of a modem for a wireless network node. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

While embodiments has been described for operation with a wireless network receiver, that operates according to the OFDM variants, e.g., the 802.11a and 802.11g variants of the IEEE 802.11 standard, the invention may be embodied in receivers and transceivers operating in other standards than the IEEE 802.11 OFDM standards, for example other WLAN standards and other wireless standards where receivers that determine the initial timing determination would be beneficial. Applications that can be accommodated include IEEE 802.11 wireless LANs and links, wireless Ethernet, HIPER-LAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

Note that the specification and claims sometimes refer to the baseband signals. It is to be understood that depending on the particular embodiment, these may be I,Q signals at true baseband, or an I-signal at "low-IF" that is relatively close to baseband. For example, one embodiment of the analog part of the receiver in radio 109 generates low-IF signals that are centered at 20 MHz and that are then digitized and downconverted to true baseband I,Q signals. The term baseband will include such low-IF signals and those in the art should understand from the context whether or not a "baseband" signal is a true baseband signal or a low-IF signal.

The term rectangular coordinates when applied to signal samples is sometimes referred to as "I, Q" coordinates, "quadrature" components and "complex numbers" (assumed in rectangular coordinates) herein.

Note that by "magnitude" is meant an indication of magnitude, and alternate embodiments may use different indications, such as the actual magnitude, $(I^2+Q^2)$, max $\{|I|+\rho|Q|\}$ where $\rho$ is a constant, and so forth. Furthermore, in determining the correlation quality, the baseline samples in different embodiments may be drawn from the past, future, or some combination of the past and future.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
    wirelessly receiving a signal;
    detecting a start of packet (SOP) from the received signal using at least one SOP detection criterion for a packet that conforms to a wireless networking standard;
    determining a plurality of metrics from the received signal; and
    in the case an SOP is detected, using at least two of the plurality of metrics to determine an initial timing for a received packet,
wherein a packet according the wireless networking standard includes a preamble, and wherein detecting the SOP includes using at least one of the set of SOP methods that comprises:
    detecting that a threshold was exceeded by a measure of the average received signal power;
    detecting that a threshold was exceeded by a measure of the average power rise of the received signal; and
    detecting that a threshold was exceeded by a measure of the quality of the correlation of the input signal with a known part of the preamble, and
    detecting a rise in a weighted sum of the measure of the average received signal power and the measure of the correlation of the input signal with the known part of the preamble.

2. A method as recited in claim 1, wherein the measure of the correlation quality is a comparison measure of the instantaneous correlation power with the average correlation power in the recent past.

3. A method as recited in claim 1, wherein the measure of the correlation quality is a measure of the correlation power normalized by the power of the received signal.

4. A method comprising:
    wirelessly receiving a signal;
    detecting a start of packet (SOP) from the received signal using at least one SOP detection criterion for a packet that conforms to a wireless networking standard;
    determining a plurality of metrics from the received signal; and
    in the case an SOP is detected, using at least two of the plurality of metrics to determine an initial timing for a received packet,
wherein a received packet conforms to at least one wireless standard, wherein a packet according each of the wireless networking standards includes a preamble, and wherein detecting the SOP includes:
    for each wireless networking standard, determining a corresponding logical function of at least one of the set of logical indicators including:
        that a threshold was exceeded by the average received signal power;
        that a threshold was exceeded by the average power rise of the received signal;
        that a threshold was exceeded by a measure of the quality of the correlation of the input signal with a known part of the preamble; and
        that a threshold was exceeded by a weighted sum of the measure of the average received signal power and the measure of the correlation of the input signal with the known part of the preamble,
    and
    determining the OR of the plurality of the corresponding logical indicators
wherein the measure of the correlation quality is a comparison measure of the instantaneous correlation power with the average correlation power in the recent past.

5. A method as recited in claim 4, wherein the measure of the correlation quality is a measure of the correlation power normalized by the power of the received signal.

6. A method comprising:
    wirelessly receiving a signal;
    detecting a start of packet (SOP) from the received signal using at least one SOP detection criterion for a packet that conforms to a wireless networking standard;
    determining a plurality of metrics from the received signal; and
    in the case an SOP is detected, using at least two of the plurality of metrics to determine an initial timing for a received packet,
wherein a packet according to the wireless networking standard includes a preamble that has a first part that includes a series of periodic symbols and a second part, and wherein determining the plurality of metrics includes determining at least two of the set of metrics that comprises:
    a measure of the carrier to noise ratio (CNR);
    a measure of the received signal power;
    a measure of the autocorrelation of the input signal at the period of the symbols;
    a measure the correlation of the input signal with at least one of the short symbols; and
    a measure of the correlation of the input signal with the start of the second part of the preamble,
wherein determining the initial timing uses at least two indicators of the set of indicators that includes:
    whether or not a measure of the carrier to noise ratio (CNR) is within a CNR range;
    that a threshold was exceeded by a measure of the change of the averaged received signal power;
    that a range was reached by a measure of the autocorrelation of the input signal at the period of the symbols;
    that a threshold was exceeded by a measure of the correlation of the input signal with at least one of the short symbols; and
    that a change was detected in a measure of the correlation of the input signal with the start of the first part of the preamble, and that a threshold was exceeded by a measure of the correlation of the input signal with the start of the second part of the preamble, and wherein determining the initial timing determines the timing from at least one of:

the time a measure of the rise in the received signal power peaks;

the time a measure of the autocorrelation of the input signal at the period of the symbols changes to indicate the time of end of the series of periodic symbols;

the time a measure the correlation of the input signal with at least one of the short symbols peaks to indicate an SOP time; and the time a measure the correlation of the input signal with at least one of the short symbols changes to indicate the time of end of the series of periodic symbols; and the time a measure of the correlation of the input signal with the start of the second part of the preamble peaks to indicate the time of the start of the second part.

7. A method as recited in claim 6, wherein the at least two metrics may further include:

in the case the wireless standard uses OFDM, a measure of the short-term power spectral density of the received signal, and in the case the wireless standard uses OFDM, a measure of interference between OFDM symbols, wherein the set of indicators further includes:

in the case the wireless standard uses OFDM, that a change was detected in a measure of the power spectral density; and in the case the wireless standard uses OFDM, that a range was reached by a measure of interference between OFDM symbols and wherein the at least one measure used for determining the initial timing further includes:

in the case the wireless standard uses OFDM, the time a change occurs in a measure of the short-term power spectral density of the received signal, and in the case the wireless standard uses OFDM, the time when a measure of the interference between OFDM symbols is lowest.

8. A method as recited in claim 7, wherein determining the measure of interference between OFDM symbols includes:

determining a measure of the channel impulse response of the channel for the received signal during the second part of the preamble, and filtering the determined impulse response with a filter having an impulse response of relatively small equal to the start of the second part of the preamble.

9. A method as recited in claim 7, wherein the set of possible metrics of which at least at least two metrics are determined includes a measure of the delay spread, and wherein the set of possible indicators of which at least two indicators are used in determining the initial timing includes whether or not a measure of the delay spread is within a delay spread range.

10. A method as recited in claim 7, wherein which of the indicators is used in the initial time determining is determined by a priori simulation under a set of different CNR and delay spread conditions.

11. A method as recited in claim 7, wherein which of the indicators is used in the initial time determining is determined by a priori experiments under a set of different CNR and delay spread conditions.

12. A method as recited in claim 7, wherein which of the indicators is used in the initial time determining is determined by a combination of a priori experiments and a priori simulations under a set of different CNR and delay spread conditions.

13. A method as recited in claim 7, wherein determining the measure of the CNR includes computing the ratio of the received power during the presence of a packet and the received signal power a relatively small time before the packet arrived.

14. A method as recited in claim 13, wherein each of the received powers before and after the packet is computed on a logarithmic scale, such that computing the ratio includes subtracting the received power during the presence of a packet and the received signal power the relatively small time before the packet arrived.

15. A method as recited in claim 7, wherein the symbols have substantially constant envelope, and wherein determining of the autocorrelation includes:

determining an approximation to the phase of the autocorrelation by phase shift key (PSK) detecting the input signal, and determining a monotonic function of the difference of the PSK detected signal and a delayed version of the PSK detected signal.

16. A method as recited in claim 15, wherein determining of the autocorrelation further includes:

filtering the determined monotonic function of the difference.

17. A method as recited in claim 7, wherein the input signal is provided as a set of received signal samples in rectangular coordinates, and wherein determining the measure of the correlation of the input signal with the start of the second part of the preamble includes:

filtering the received signal samples using a FIR filter whose coefficients are time-reversed, complex conjugated samples of start of the second part, quantized to rectangular coordinates of ±1.

18. A method as recited in claim 7, wherein determining the measure of the correlation of the input signal with the start of the second part of the preamble includes calculating the amplitude of the correlation, and comparing the amplitude of the correlation with an average of recent samples of the correlation amplitude.

19. A method as recited in claim 7, wherein the wireless networking standard is an IEEE 802.11 OFDM standard according to which the first part of the preamble includes a periodic series of short symbols and the second part includes long symbols and a guard interval.

20. A method as recited in claim 7, wherein the determining of the initial timing includes:

detecting whether or not a measure of the CNR is in a CNR range wherein a first metric of the set of metrics is expected to be effective, and using the first metric for the initial timing determining only if it is detected that the measure of the CNR is in the CNR range.

21. A method as recited in claim 20, wherein the first metric is the measure of autocorrelation, and such that determining of initial timing uses that a range was reached by the autocorrelation measure only if it is detected that the measure of the CNR is in the CNR range.

22. A method as recited in claim 21, wherein determining the initial timing uses the time of the peak of the measure of the correlation of the input signal with the start of the second part of the preamble.

23. A method comprising:
wirelessly receiving a signal;
detecting a start of packet (SOP) from the received signal using at least one SOP detection criterion for a packet that conforms to a wireless networking standard, a packet according to the wireless networking standard including a preamble that has a first part that includes a series of periodic symbols and a second part; and
in the case an SOP is detected,
  detecting whether or not a measure of the CNR is in a CNR range wherein it is expected that a change of a measure of the autocorrelation of the input signal at the period of the symbols is effective to indicate the time of end of the series of periodic symbols; and
  determining an initial timing for a packet using that a threshold was exceeded by a measure of the correlation of the input signal with the start of the second part of the preamble, further using the time of a peak in the correlation of the input signal with the start of the second part of the preamble, and, if it is detected that the measure of the CNR is in the CNR range, further using that a range was reached by the autocorrelation measure.

24. An apparatus comprising:
a radio receiver to receive a signal and output a received signal;
a start of packet (SOP) detector coupled to the radio receiver to detect an SOP from a received signal using at least one SOP detection criterion for a packet that conforms to a wireless networking standard;
a processing circuit coupled to the radio receiver and configured to determine a plurality of metrics from the received signal; and
an initial time determining circuit coupled to the SOP detector and the processing circuit, the initial time determining circuit using at least two of the plurality of metrics to determine an initial timing for a received packet in the case an SOP is detected,
wherein a packet according to the wireless networking standard includes a preamble that has a first part that includes a series of periodic symbols and a second part, and wherein the processing circuit includes at least two of the set that comprises:
  a circuit to determine a measure of the carrier to noise ratio (CNR);
  a circuit to determine a measure of the rise in the received signal power;
  an autocorrelation circuit to determine a measure of the autocorrelation of the input signal at the period of the symbols;
  a symbol correlation circuit to determine a measure the correlation of the input signal with at least one of the short symbols; and
  a second correlation circuit to determine a measure of the correlation of the input signal with the start of the second part of the preamble,
wherein the initial timing determining circuit determines the initial timing using at least two indicators of the set of indicators that comprises:
  whether or not a measure of the carrier to noise ratio (CNR) is within a CNR range;
  that a threshold was exceeded by a measure of the rise in the received signal power to indicate an SOP time;
  that a range was reached by a measure of the autocorrelation of the input signal at the period of the symbols;
  that a threshold was exceeded by a measure of the correlation of the input signal with at least one of the short symbols; and
  that a threshold was exceeded by a measure of the correlation of the input signal with the start of the second part of the preamble,
wherein the initial timing determining circuit determines the initial timing from at least one of:
  the time a measure of the received signal power exceeds a signal power threshold to indicate an SOP time;
  the time a measure of the autocorrelation of the input signal at the period of the symbols changes to indicate the time of end of the series of periodic symbols;
  the time a measure the correlation of the input signal with at least one of the short symbols peaks to indicate an SOP time; and
  the time a measure of the correlation of the input signal with the start of the second part of the preamble peaks to indicate the time of the start of the second part, and
wherein the symbols have substantially constant envelope, and wherein autocorrelation circuit includes a phase shift key (PSK) detector to determine a coarsely quantized phase estimate, and a difference circuit to determine a monotonic function of the difference of the coarsely quantized phase estimate and a delayed version of the coarsely quantized phase estimate.

25. An apparatus as recited in claim 24, wherein the autocorrelation circuit further includes a filter to filter the determined monotonic function of the difference.

26. An apparatus as recited in claim 24, wherein the wireless networking standard is an IEEE 802.11 OFDM standard according to which the first part of the preamble includes a periodic series of short symbols and the second part includes long symbols and a guard interval.

27. An apparatus comprising:
a radio receiver to receive a signal and output a received signal;
a start of packet (SOP) detector coupled to the radio receiver to detect an SOP from a received signal using at least one SOP detection criterion for a packet that conforms to a wireless networking standard;
a processing circuit coupled to the radio receiver and configured to determine a plurality of metrics from the received signal; and
an initial time determining circuit coupled to the SOP detector and the processing circuit, the initial time determining circuit using at least two of the plurality of metrics to determine an initial timing for a received packet in the case an SOP is detected,
wherein a packet according to the wireless networking standard includes a preamble that has a first part that includes a series of periodic symbols and a second part, and wherein the processing circuit includes at least two of the set that comprises:
  a circuit to determine a measure of the carrier to noise ratio (CNR);
  a circuit to determine a measure of the rise in the received signal power;
  an autocorrelation circuit to determine a measure of the autocorrelation of the input signal at the period of the symbols;
  a symbol correlation circuit to determine a measure the correlation of the input signal with at least one of the short symbols; and
  a second correlation circuit to determine a measure of the correlation of the input signal with the start of the second part of the preamble, wherein the initial timing determining circuit determines the initial timing using at least two indicators of the set of indicators that comprises:

whether or not a measure of the carrier to noise ratio (CNR) is within a CNR range;

that a threshold was exceeded by a measure of the rise in the received signal power to indicate an SOP time;

that a range was reached by a measure of the autocorrelation of the input signal at the period of the symbols;

that a threshold was exceeded by a measure of the correlation of the input signal with at least one of the short symbols; and that a threshold was exceeded by a measure of the correlation of the input signal with the start of the second part of the preamble, wherein the initial timing determining circuit determines the initial timing from at least one of:

the time a measure of the received signal power exceeds a signal power threshold to indicate an SOP time;

the time a measure of the autocorrelation of the input signal at the period of the symbols changes to indicate the time of end of the series of periodic symbols;

the time a measure the correlation of the input signal with at least one of the short symbols peaks to indicate an SOP time; and the time a measure of the correlation of the input signal with the start of the second part of the preamble peaks to indicate the time of the start of the second part, wherein the initial time determining circuit includes:

a detector to detect whether or not a measure of the CNR is in a CNR range wherein a first metric of the set of metrics is expected to be effective, and wherein initial time determining circuit uses the first metric for the initial timing determining only if it is detected that the measure of the CNR is in the CNR range.

28. An apparatus as recited in claim 27, wherein the first metric is the measure of autocorrelation, and such that initial time determining circuit uses that a range was reached by the autocorrelation measure only if it is detected that the measure of the CNR is in the CNR range.

29. An apparatus as recited in claim 28, wherein initial time determining circuit uses the time of the peak of said measure of the correlation of the input signal with the start of the second part of the preamble.

30. An apparatus comprising:

a radio receiver to receive a signal;

a start of packet (SOP) detector coupled to the radio to detect an SOP from the received signal using at least one SOP detection criterion for a packet that conforms to a wireless networking standard, a packet according to the wireless networking standard including a preamble that has a first part that includes a series of periodic symbols and a second part;

a CNR detector coupled to the SOP detector and to the radio receiver to detect, in the case an SOP is detected, whether or not a measure of the CNR is in a CNR range wherein it is expected that a change of a measure of the autocorrelation of the input signal at the period of the symbols is effective to indicate the time of end of the series of periodic symbols;

an autocorrelator coupled to radio receiver to determine the measure of the autocorrelation of an input signal at the period of the symbols;

an autocorrelation detector coupled to the autocorrelator to detect a change in the measure of the autocorrelation;

a correlator coupled to the radio receiver to determine a measure of the correlation of the input signal with the start of the second part of the preamble; and an initial time determining circuit coupled to the CNR detector, the autocorrelation detector, and to the correlator to determine an initial timing for a packet using that a threshold was exceeded by a measure of the correlation of the input signal with the start of the second part of the preamble, further using the time of a peak in the correlation of the input signal with the start of the second part of the preamble, and, if it is detected that the measure of the CNR is in the CNR range, further using that a range was reached by the autocorrelation measure.

31. An apparatus comprising:

means for wirelessly receiving a signal;

means for detecting a start of packet (SOP) detector from a received signal using at least one SOP detection criterion for a packet that conforms to a wireless networking standard;

means for determining a plurality of metrics from the received signal; and means for determining an initial timing for a received packet in the case an SOP is detected, the initial time determining means using at least two of the plurality of metrics to determine the initial timing, wherein a packet according to the wireless networking standard includes a preamble that has a first part that includes a series of periodic symbols and a second part, and wherein the means for determining the plurality of metrics includes at least two of the set that comprises:

means for determining a measure of the carrier to noise ratio (CNR);

means for determining a measure of the rise of received signal power;

means for determining a measure of the autocorrelation of the input signal at the period of the symbols;

means for determining a measure the correlation of the input signal with at least one of the short symbols; and means for determining a measure of the correlation of the input signal with the start of the second part of the preamble, wherein the initial timing determining means uses at least two indicators of the set of indicators that comprises:

whether or not a measure of the carrier to noise ratio (CNR) is within a CNR range;

that a threshold was exceeded by a measure of the rise of the received signal power to indicate an SOP time;

that a range was reached by a measure of the autocorrelation of the input signal at the period of the symbols;

that a threshold was exceeded by a measure of the correlation of the input signal with at least one of the short symbols; and that a threshold was exceeded by a measure of the correlation of the input signal with the start of the second part of the preamble, wherein the initial timing determining means further uses at least one of:

the time a measure of the rise of the received signal power peaks to indicate an SOP time;

the time a measure of the autocorrelation of the input signal at the period of the symbols changes to indicate the time of end of the series of periodic symbols;

the time a measure the correlation of the input signal with at least one of the short symbols peaks to indicate an SOP time; and the time a measure of the correlation of the input signal with the start of the second part of the preamble peaks to indicate the time of the start of the second part, to provide a measure of the initial timing, and wherein the symbols have substantially constant envelope, and wherein the autocorrelation means includes means to phase shift key (PSK) detect for determining a PSK detected signal, and means for determining a monotonic function of the difference of the PSK detected signal and a delayed version of the PSK detected signal.

32. An apparatus as recited in claim 31, wherein the wireless networking standard is an IEEE 802.11 OFDM standard according to which the first part of the preamble includes a periodic series of short symbols and the second part includes long symbols and a guard interval.

33. A method comprising:
wirelessly receiving a signal;
detecting a start of packet (SOP) from the received signal using at least one SOP detection criterion for a packet that conforms to a wireless networking standard;
in the case an SOP is detected, determine an initial timing for a received packet,
wherein a received packet conforms to at least one wireless standard, wherein a packet according to each of the wireless networking standards includes a preamble, and wherein detecting the SOP includes:
for each wireless networking standard, determining a corresponding logical function of at least two of the set of logical indicators including:
that a threshold was exceeded by the average received signal power;
that a threshold was exceeded by the average power rise of the received signal;
that a threshold was exceeded by a measure of the quality of the correlation of the input signal with a known part of the preamble; and
that a threshold was exceeded by a weighted sum of the measure of the average received signal power and the measure of the correlation of the input signal with the known part of the preamble,
and
determining the OR of the plurality of the corresponding logical indicators, and
wherein the measure of the correlation quality is a comparison measure of the instantaneous correlation power with the average correlation power in the recent past.

34. A method as recited in claim 33, wherein the measure of the correlation quality is a measure of the correlation power normalized by the power of the received signal.

35. A method as recited in claim 33, wherein a packet according to the wireless networking standard includes a preamble that has a first part that includes a series of periodic symbols and a second part,
such that a measure of the correlation of the input signal with at least one of the short symbols the measure of the correlation of the input signal with a known part of the preamble.

36. A method comprising:
wirelessly receiving a signal;
detecting a start of packet (SOP) from the received signal using at least one SOP detection criterion for a packet that conforms to a wireless networking standard;
in the case an SOP is detected, determine an initial timing for a received packet,
wherein a packet according to the wireless networking standard includes a preamble, and wherein detecting the SOP includes using at least one of the set of SOP methods that comprises:
detecting that a threshold was exceeded by the average received signal power;
detecting that a threshold was exceeded by the average power rise of the received signal;
detecting that a threshold was exceeded by a measure of the quality of the correlation of the input signal with a known part of the preamble;
wherein detecting that a threshold was exceeded by the average power rise of the received signal includes computing the ratio of the received power during the presence of a packet and the received signal power before the packet arrived, and wherein each of the received powers before and after the packet is computed on a logarithmic scale, such that computing the ratio includes subtracting the received power during the presence of a packet and the received signal power before the packet arrived.

37. A method comprising:
wirelessly receiving a signal;
detecting a start of packet (SOP) from the received signal using at least one SOP detection criterion for a packet that conforms to a wireless networking standard;
in the case an SOP is detected, determine an initial timing for a received packet,
wherein a packet according the wireless networking standard includes a preamble, and wherein detecting the SOP includes using a set of SOP methods that comprises:
detecting that a threshold was exceeded by a measure of the quality of the correlation of the input signal with a known part of the preamble;
wherein a packet according to the wireless networking standard includes a preamble that has a first part that includes a series of periodic symbols and a second part, further comprising:
determining a measure of the correlation of the input signal with at least one of the short symbols to provide a measure of the correlation of the input signal with a known part of the preamble, and
wherein the input signal is provided as a set of received signal samples in rectangular coordinates, and wherein determining the measure of the correlation of the input signal with at least one of the short symbols includes:
filtering the received signal samples using a FIR filter whose coefficients are time-reversed, complex conjugated samples of at least one of the short symbols, quantized to rectangular coordinates of ±1.

38. A method as recited in claim 37, wherein the wireless networking standard is an IEEE 802.11 OFDM standard according to which the first part of the preamble includes a periodic series of short symbols and the second part includes long symbols and a guard interval.

* * * * *

UNITED STATES PATENT AND TRADEMARK OFFICE
CERTIFICATE OF CORRECTION

PATENT NO. : 7,480,234 B1
APPLICATION NO. : 10/698703
DATED : January 20, 2009
INVENTOR(S) : Hart et al.

It is certified that error appears in the above-identified patent and that said Letters Patent is hereby corrected as shown below:

In column 5, line 38, kindly replace "802:11g" with --802.11g--

In column 7, line 14, kindly replace "provides'" with --provides--

In column 7, line 17, kindly replace "subcariiers" with --subcarriers--

In column 13, line 24, kindly replace "RSSL" with --RSSI--

In column 16, line 44, kindly replace "{+ ±1,0}" with --{±1,0}--

In column 17, line 48, kindly replace "FF" with --FFT--

In column 22, line 66, kindly replace "soplia" with --sop11a--

Signed and Sealed this

Thirty-first Day of March, 2009

JOHN DOLL
*Acting Director of the United States Patent and Trademark Office*